US009450831B2

(12) United States Patent
Soneda et al.

(10) Patent No.: US 9,450,831 B2
(45) Date of Patent: Sep. 20, 2016

(54) NODE APPARATUS AND COMMUNICATION METHOD

(71) Applicant: FUJITSU LIMITED, Kawasaki-shi, Kanagawa (JP)

(72) Inventors: Tatsuya Soneda, Fukuoka (JP); Tetsu Yamamoto, Kawasaki (JP); Norihito Nishimoto, Fukuoka (JP); Tadashige Iwao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/507,285

(22) Filed: Oct. 6, 2014

(65) Prior Publication Data

US 2015/0023214 A1    Jan. 22, 2015

Related U.S. Application Data

(63) Continuation of application No. PCT/JP2012/062562, filed on May 16, 2012.

(51) Int. Cl.
| | |
|---|---|
| *H04L 12/24* | (2006.01) |
| *H04W 24/02* | (2009.01) |
| *H04W 40/24* | (2009.01) |
| *H04W 40/32* | (2009.01) |
| *H04W 84/18* | (2009.01) |

(52) U.S. Cl.
CPC ............. *H04L 41/12* (2013.01); *H04W 24/02* (2013.01); *H04W 40/24* (2013.01); *H04W 40/32* (2013.01); *H04W 84/18* (2013.01)

(58) Field of Classification Search
CPC .... H04L 41/12; H04W 24/02; H04W 40/24; H04W 40/32
USPC ......................................................... 370/254
See application file for complete search history.

(56) References Cited

U.S. PATENT DOCUMENTS

2006/0007882 A1*  1/2006  Zeng ..................... H04L 45/00
                                                                 370/328
2008/0151801 A1    6/2008  Mizuta

FOREIGN PATENT DOCUMENTS

| JP | 2006-186446 | 7/2006 |
| WO | WO 2006/067922 A1 | 6/2006 |

OTHER PUBLICATIONS

Shibuya et al., "ITS2009-85: A Method of Cluster Mergence Considering Network Condition for Periodic Broadcasting VANET with Clustering", *IEICE Technical Report*, Mar. 2010, pp. 1-6, The Institute of Electronics, Information and Communication Engineers.
International Search Report mailed Aug. 21, 2012, in corresponding International Patent Application No. PCT/JP2012/062562.

* cited by examiner

*Primary Examiner* — Ronald B Abelson
(74) *Attorney, Agent, or Firm* — Staas & Halsey LLP

(57) ABSTRACT

A node apparatus in a network including a plurality of node apparatuses includes: a cluster information memory configured to store apparatus identification information of node apparatus included in a first cluster including the node apparatus; a merge cluster node number determination unit configured to obtain the number of node apparatuses included in the second cluster based on information included in the hello packet upon receipt of a hello packet from one of adjacent node apparatuses included in a second cluster, and to determine whether a sum of the number of node apparatuses included in the first cluster and that of node apparatuses included in the second cluster is equal to or smaller than a maximum number of cluster nodes; and a cluster merge processing unit configured to merge the second cluster with the first cluster based on a result of the determination.

12 Claims, 34 Drawing Sheets

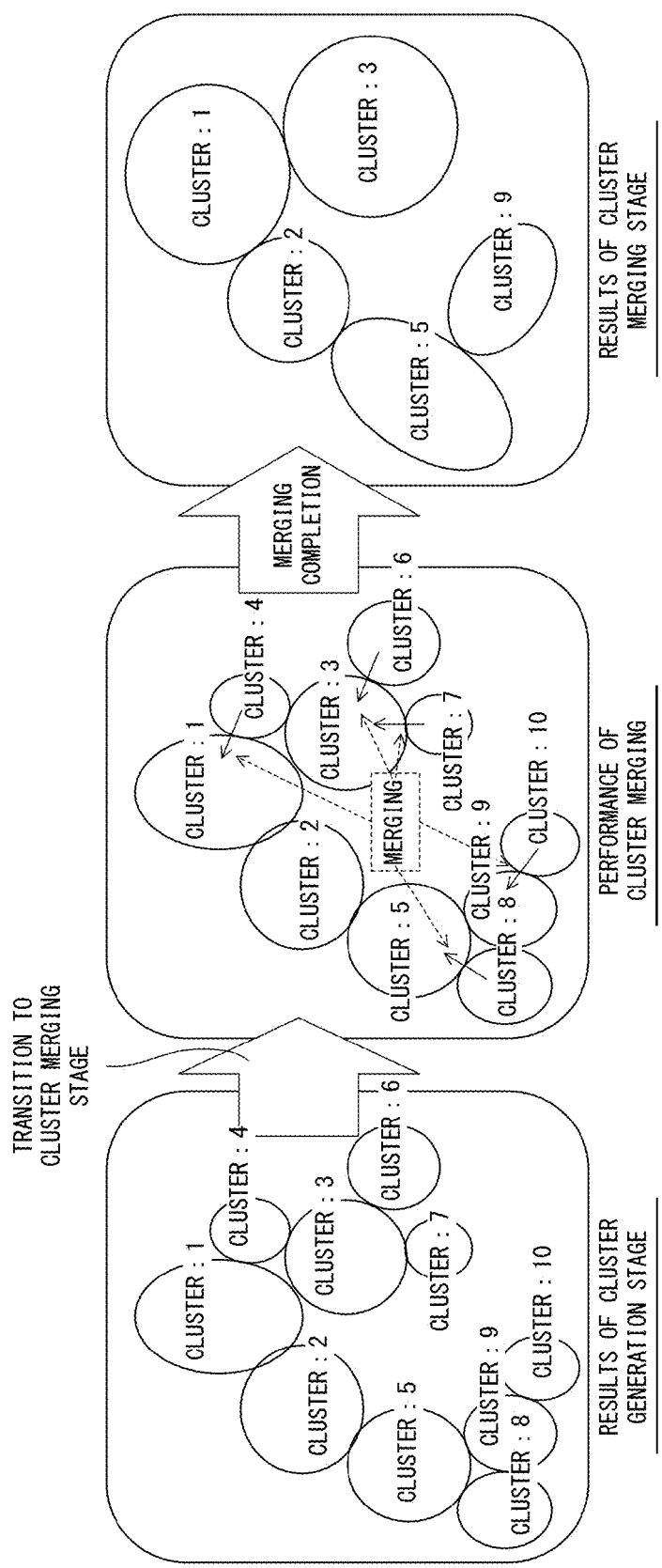

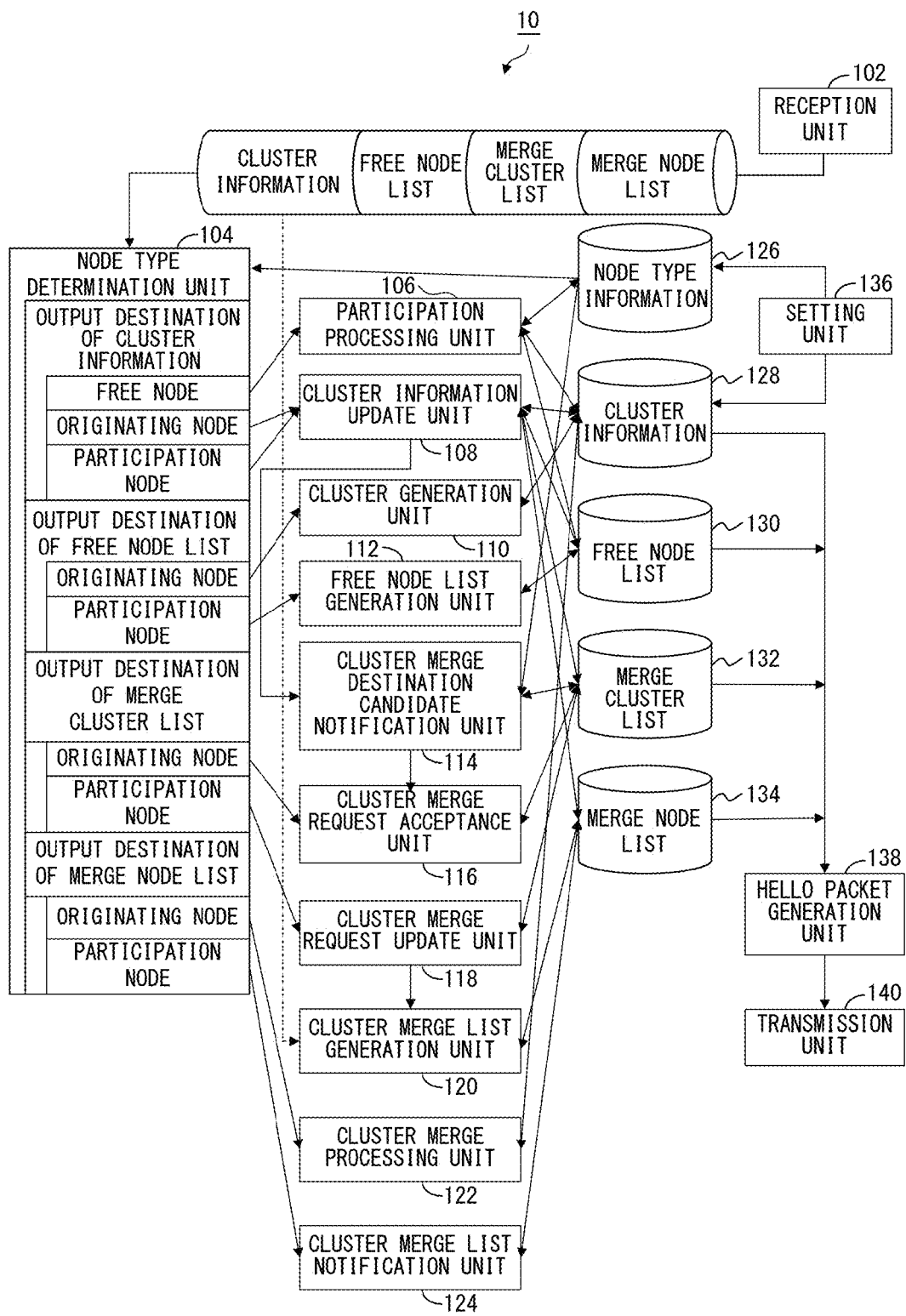
F I G. 3

Hello 1

| Type | GD | GS | LS | LD | CI | FNL | MNL | MCL |
|------|----|----|----|----|----|----|----|----|

↳ <SID, {NID}>
= <3, {}>

F I G. 7

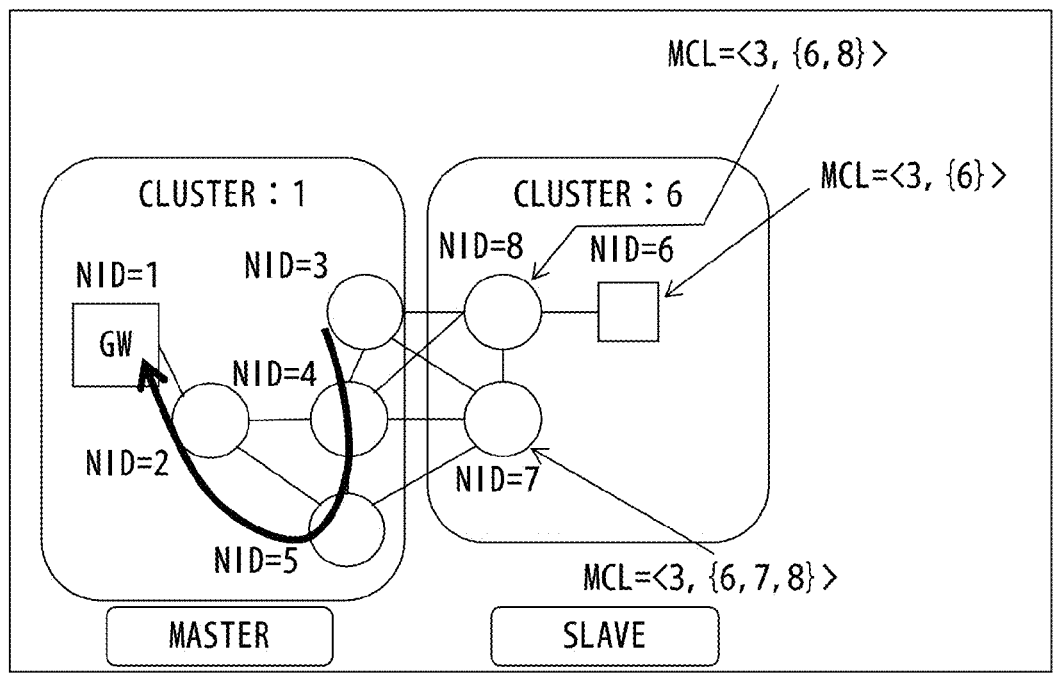
F I G. 8

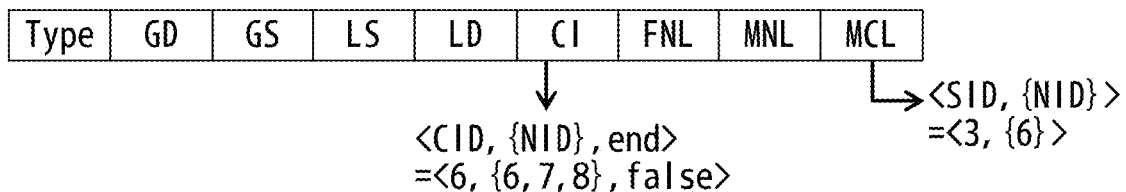
F I G. 9 A

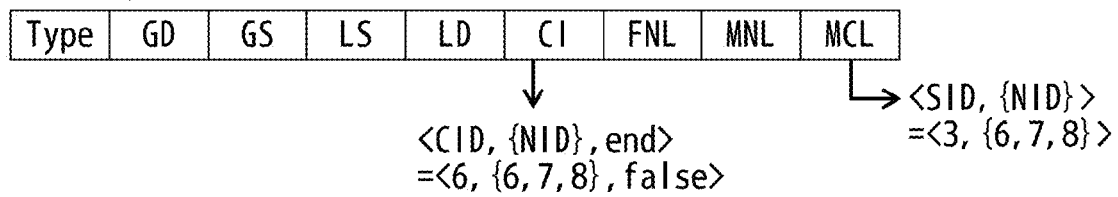
F I G. 9 B

Hello 4

| Type | GD | GS | LS | LD | CI | FNL | MNL | MCL |
|------|----|----|----|----|----|-----|-----|-----|

⟨CID, {NID}, end⟩　　⟨{NID}⟩　　⟨SID, {NID}⟩
=⟨1, {1,2,3,4,5}, false⟩　=⟨{6,7,8}⟩　=⟨, {}⟩

F I G. 9 C

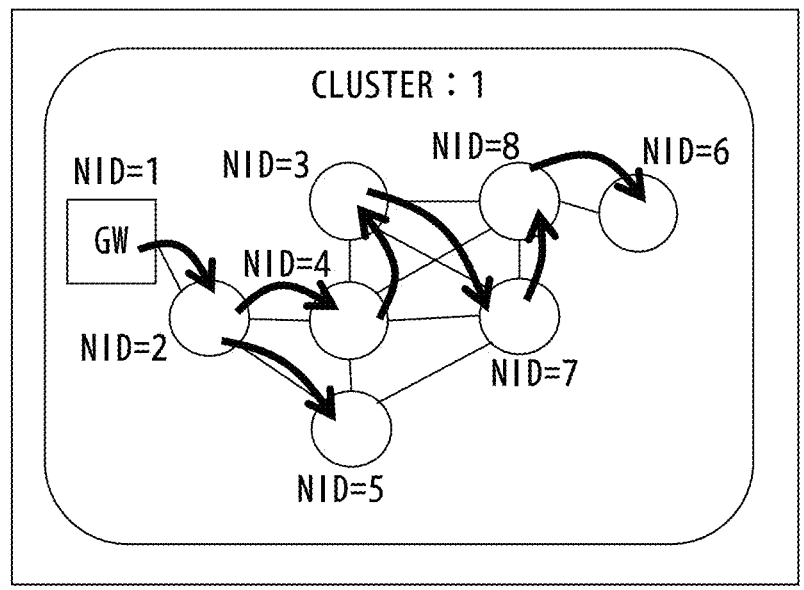
F I G. 1 2

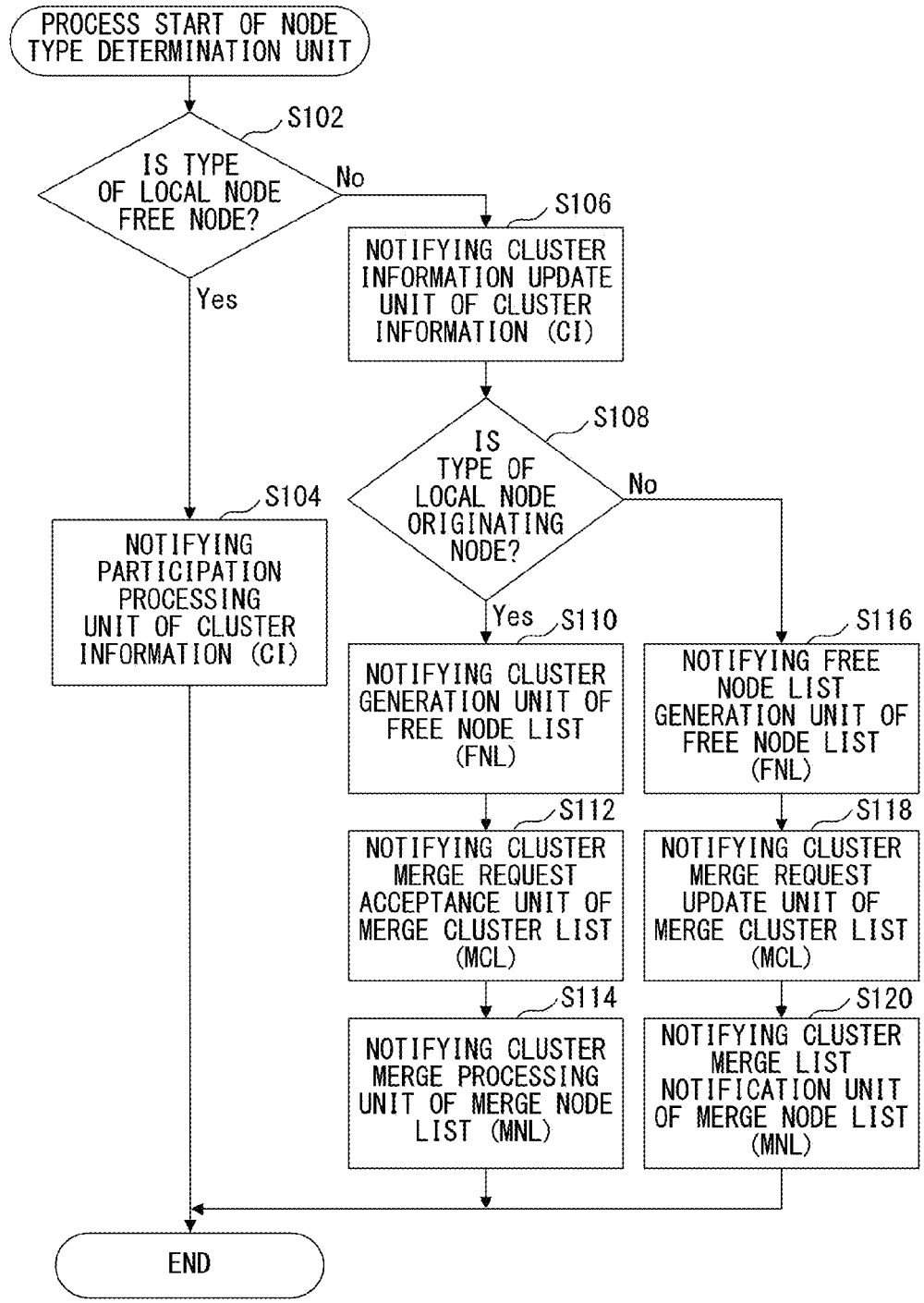
F I G. 1 4

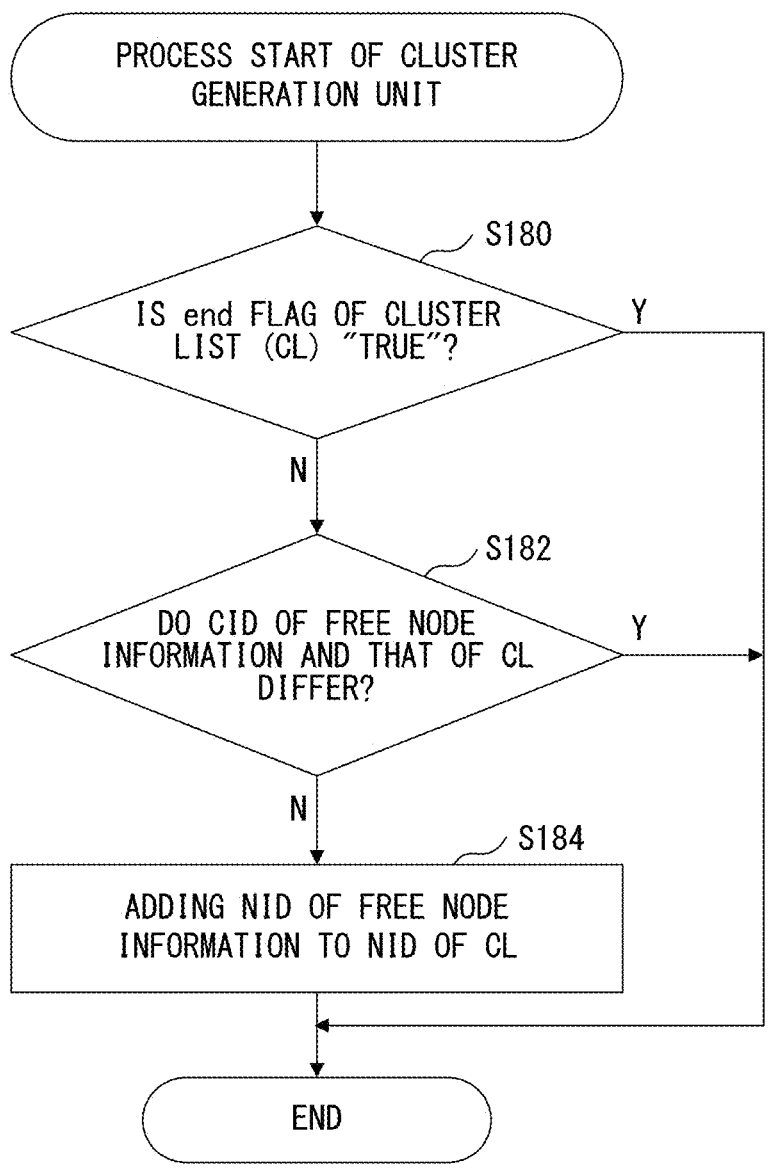
F I G. 17

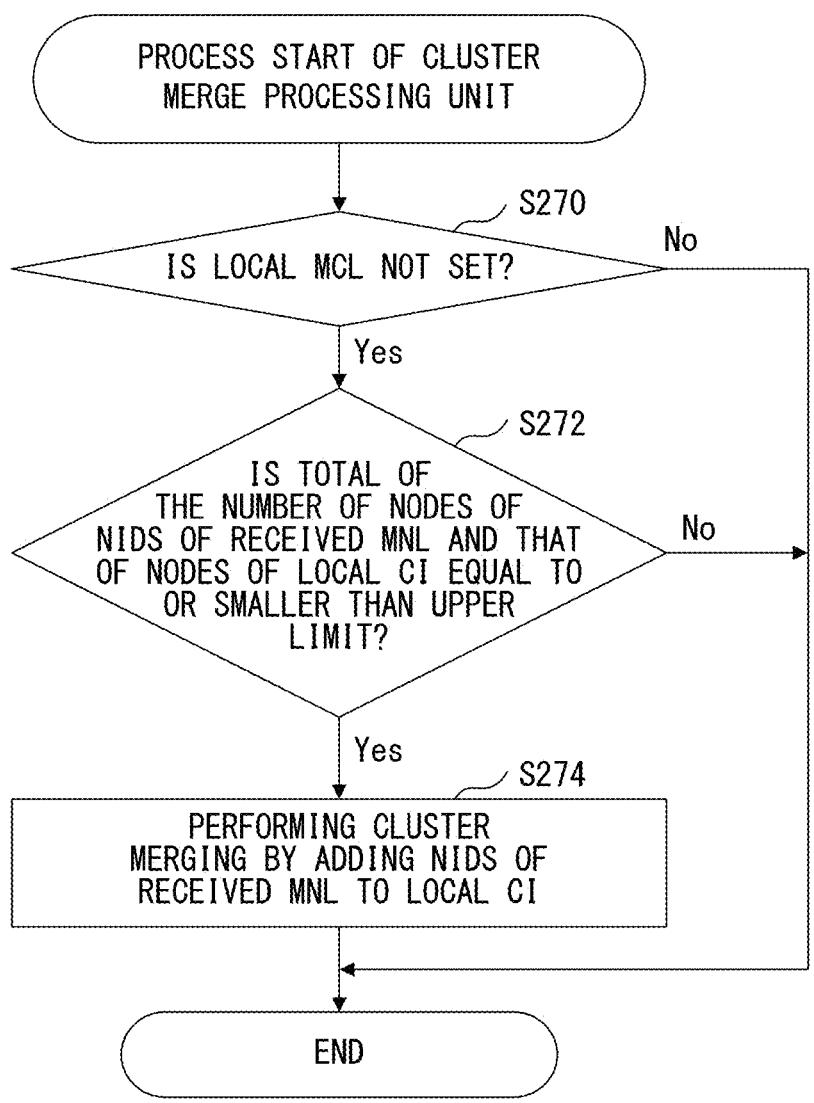
F I G. 2 3

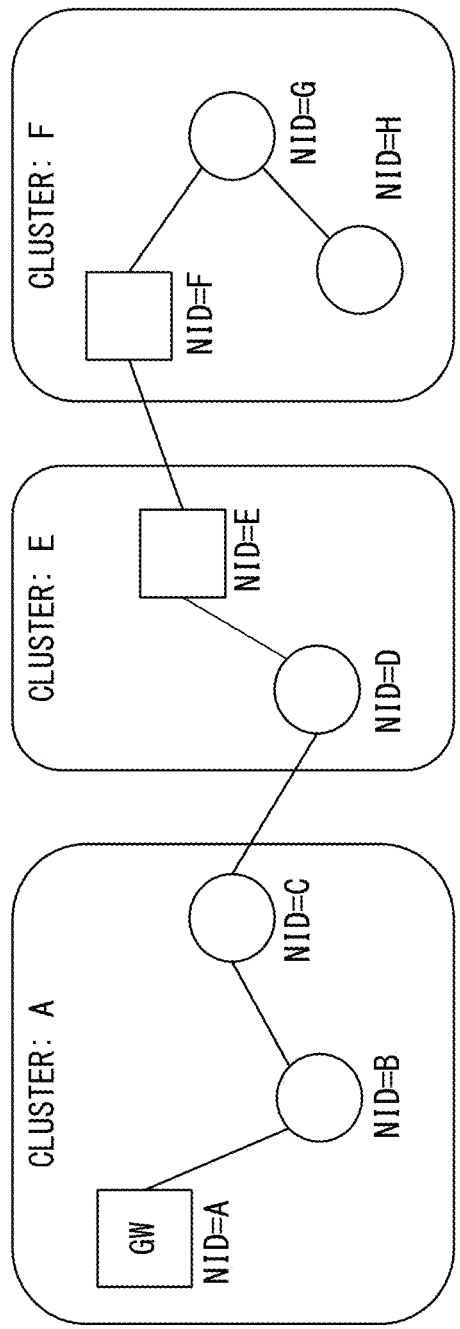
F I G. 26

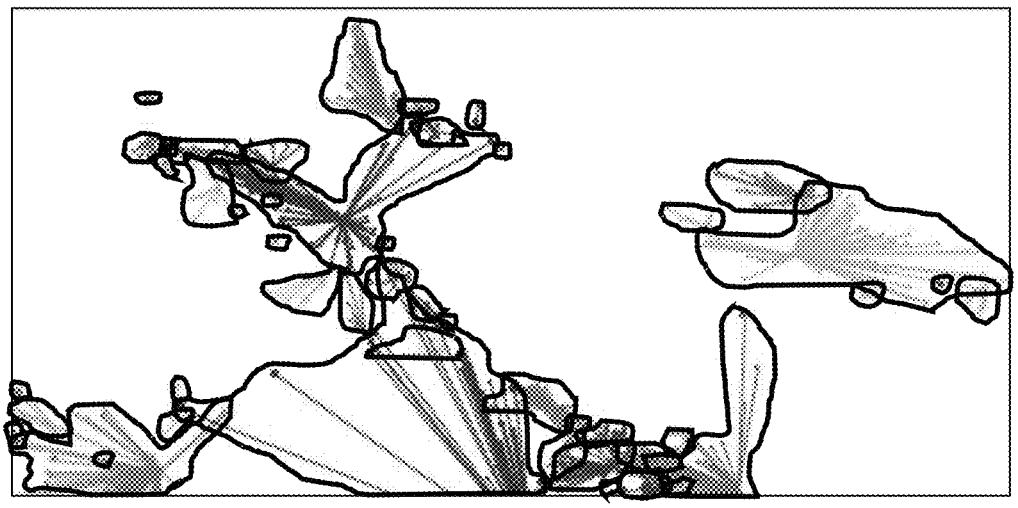
F I G. 29

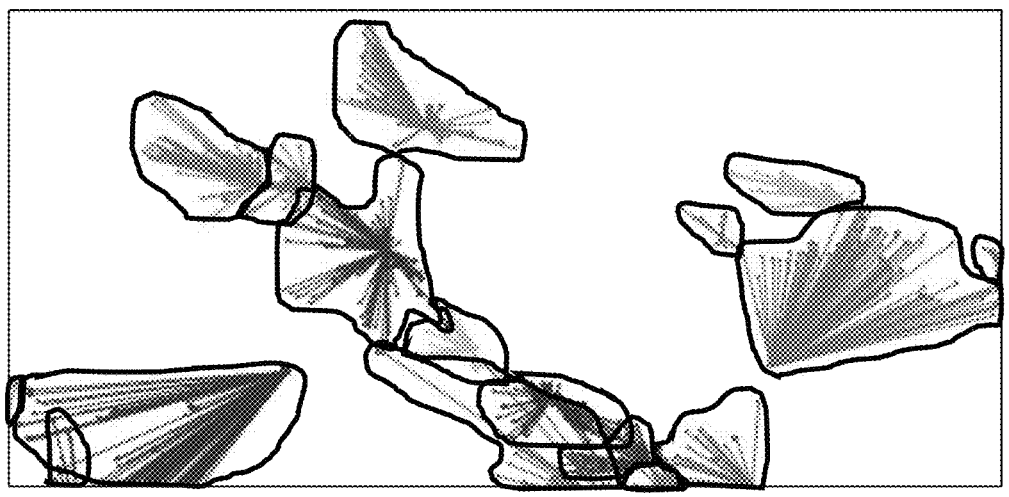
F I G. 30

NODE APPARATUS AND COMMUNICATION METHOD

This application is a continuation application of International Application PCT/JP2012/062562 filed on May 16, 2012 and designated the U.S., the entire contents of which are incorporated herein by reference.

FIELD

The embodiments discussed herein are related to a network apparatus and a communication method, which are used in a network that includes a plurality of nodes.

BACKGROUND

In an adhoc network system, communication terminals (referred to also as node apparatuses or simply as nodes) in an adhoc network autonomously connect to the network, and enable a mutual communication. The term "autonomously" means that a use does not need to set a communication route as occasion demands and a communication terminal or an infrastructure dedicated to management of communications of a server and a router is not needed.

As routing protocols of an adhoc network (adhoc protocols), Adhoc On Demand Distance Vector Algorithm (AODV) of a reactive type, and Optimized Link State Routing (OLSR) of a proactive type (OLSR) are known.

AODV is a technique with which communication node apparatus repeatedly broadcasts a packet by using broadcasting in order to search for a route and detects a route to target node apparatus. Communication node apparatus transmits a packet called "Route Request (RREQ)" to neighboring apparatuses in order to detect a target route. In this packet, a communication node ID of a detection target is explicitly described.

Neighboring communication node apparatus newly creates a RREQ packet when the local node apparatus is not searched, and repeatedly broadcasts the packet to neighboring communication node apparatuses. At this time, each of the communication node apparatuses records from which adjacent communication node apparatus a message addressed to a destination is received. When the RREQ message reaches target communication node apparatus, the target communication node apparatus creates a "Route Reply (PREP)" packet, and transmits the PREP packet so that the route on which the PREQ packet has been transmitted is traced. In this way, a bidirectional communication route is created.

With the OLSR, communication node apparatuses regularly exchange a packet, so that they grasp the entire network, and detect a route up to a target communication node. The communication node apparatuses regularly transmit a Hello packet, and each notify the counterpart that the local node apparatus resides. When the communication node apparatus, which will be a communication counterpart, is proved to reside, a path for flooding, which is called Multi Point Relay (MPR) and intended to efficiently deliver a packet to the entire network, is generated next. With the MPR, a packet can be efficiently broadcast from each communication node apparatus to the entire network. Next, the node apparatuses mutually deliver a Technology Control (TC) packet, which is a route generation message, by using this MPR, so that all node apparatuses can learn a network topology. To transmit a packet to target communication node apparatus, local communication node apparatus, which will be a source, references a network topology that the local communication node apparatus learns, and passes the packet to adjacent communication node apparatus to which the packet is to be transmitted. Also the adjacent node similarly executes the process. Finally, the packet is delivered to the target node apparatus.

Node apparatus that belongs to a wireless adhoc network uses a Hello packet in order to propagate routing information.

Assume that an adhoc network includes node apparatuses A and B. The node apparatus A generates a Hello packet including routing information that the local node apparatus holds, and regularly broadcasts the packet. The node apparatus B that has received the Hello packet makes a comparison between routing information that the local node apparatus holds and information included in the Hello packet, and obtains, from the Hello packet, routing information that the node apparatus B does not hold. Moreover, the node apparatus B also obtains quality information of a route from the Hello packet, and performs a communication by using a route having the highest possible quality. As described above, node apparatus that belongs to an adhoc network learns information of routes to other node apparatuses included in the network by using a Hello packet, and estimates an optimal route. Then, the node apparatus performs a communication by using the estimated optimal route. Each node apparatus included in the adhoc network holds, in a routing table, routes to all the other node apparatuses within the adhoc network. For example, the node apparatus A holds, in the routing table, information of routes to node apparatuses other than the local node apparatus within the adhoc network. Accordingly, the node apparatus A is able to transmit a data packet, for example, to node apparatus C via node apparatus B. Such node apparatus sometimes includes a weight table for storing weight information of a node, which is a relay destination for each final destination of a packet. In this case, the node apparatus identifies a node, which is to be a destination for relaying a packet, by referencing a weight table corresponding to the destination node of the packet when the node apparatus transfers the packet.

However, with the method by which each node apparatus holds, in a routing table, routes to all the other node apparatuses within an adhoc network, the size of the routing table increases as the number of node apparatuses within the network grows. Therefore, a method by which node apparatuses within a network are grouped into clusters and each of the node apparatuses stores, in a routing table, information of routes to node apparatuses within the same cluster is known.

There is a method using a control packet when a cluster is generated from node apparatuses within a network. For example, a cluster to which each node apparatus belongs is decided based on route information, and a control packet is transmitted and received when node apparatus participates in or departs from the cluster. Generally, when a cluster is formed, another cluster is generated when the number of nodes within the cluster exceeds a specified value. Also a method using not a control packet but a Hello packet is known.

There is a problem such that a load imposed on node apparatus is increased by a transmission/reception or a relay process of a control packet when the control packet is unicast or flooded to all node apparatuses within a network.

Additionally, a method for forming clusters by repeating a process of generating another cluster when the number of nodes within a cluster exceeds a specified value has a problem such that fluctuations in the number of clusters occur in the clusters depending on a layout of nodes. Namely, the number of clusters sometimes exceeds "the number of nodes within the entire network÷ an upper limit number of nodes within a cluster". When this method is applied to a large-scale network including node apparatuses on the order of several thousands, the number of clusters straddled at the time of routing increases when the number of clusters grows, posing a problem of degradation of a throughput.

[Patent Document 1] International Publication Pamphlet No. 2006/067922

SUMMARY

According to an aspect of the embodiments, a node apparatus in a network including a plurality of node apparatuses includes: a cluster information memory configured to store apparatus identification information of node apparatus included in a first cluster, which is a group of node apparatuses the route information of which is stored by the node apparatus, among the plurality of node apparatuses in the network; a reception unit configured to receive, from adjacent node apparatus, a hello packet used to notify route information about a route for conveying information in the network, and apparatus identification information of node apparatus included in a second cluster, which is a group of node apparatuses the route information of which is stored by the node apparatus; a cluster node change verification unit configured to verify that the number of node apparatuses included in the first cluster is equal to or lower than a specified ratio to a maximum number of cluster nodes defined with a specified integer value, and that the number does not change for a specified amount of time; a merge cluster node number determination unit configured to obtain the number of node apparatuses included in the first cluster from the apparatus identification information of the node apparatus, which is stored in the cluster information memory, upon receipt of the hello packet from one of adjacent node apparatuses included in the second cluster different from the first cluster, and to determine whether a sum of the number of node apparatuses included in the first cluster and that of node apparatuses included in the second cluster is equal to or smaller than the maximum number of cluster nodes; a cluster merge processing unit configured to update the apparatus identification information stored in the cluster information memory by adding the apparatus identification information of the node apparatuses included in the second cluster to the apparatus identification information of the node apparatuses included in the first cluster, and to merge the second cluster with the first cluster; a hello packet generation unit configured to generate a different hello packet by referencing the updated apparatus identification information of the node apparatuses, which is stored in the cluster information memory; and a transmission unit configured to transmit the different hello packet.

The object and advantages of the invention will be realized and attained by means of the elements and combinations particularly pointed out in the claims.

It is to be understood that both the foregoing generation description and the following detailed description are exemplary and explanatory and are not restrictive of the invention.

BRIEF DESCRIPTION OF DRAWINGS

FIGS. 2A, 2B, and 2C are explanatory diagrams of an outline of a cluster forming process for forming clusters in stages.

FIG. 3 is a functional block diagram illustrating an example of a configuration of node apparatus.

FIG. 7 illustrates an example of a Hello packet broadcast with the cluster merge destination candidate notification process.

FIG. 8 is an explanatory diagram of an outline of a cluster merge request notification process in a cluster merge request notification processing unit.

FIG. 9A illustrates an example of a first Hello packet broadcast with a process executed in the cluster merge request notification processing unit.

FIG. 9B illustrates an example of a second Hello packet broadcast with a process executed in the cluster merge request notification processing unit.

FIG. 9C illustrates an example of a third Hello packet broadcast with a process executed in the cluster merge request notification processing unit.

FIG. 12 is an explanatory diagram of an outline of a cluster merging completion process executed in a cluster information updating unit.

FIG. 14 is a flowchart illustrating an example of a flow of a process executed in a node type determination unit.

FIG. 17 is a flowchart illustrating an example of a flow of a process executed in a cluster generation unit.

FIG. 23 is a flowchart illustrating an example of a flow of a process executed in a cluster merge processing unit.

FIG. 26 illustrates an example of a topology of a network before clusters are merged.

FIG. 29 illustrates an example of results of cluster forming in an adhoc network including node apparatuses referred to in a comparison example.

FIG. 30 illustrates an example of results of cluster forming in an adhoc network including node apparatuses according to an embodiment.

DESCRIPTION OF EMBODIMENTS

Apparatus, which is node apparatus in an adhoc network and able to perform cluster forming in two stages, is described below with reference to the drawings.

A comparison example and an outline of the present invention are initially described with reference to FIGS. 1 and 2. Thereafter, node apparatus 10 that is able to perform cluster forming in two stages is described with reference to FIGS. 3 to 30.

The node apparatus 10 described with reference to FIGS. 3 to 30 is able to lighten a load imposed on a network by performing cluster forming in two stages such as a cluster generation process and a cluster merging process only with a transmission and reception of a Hello packet, and to perform cluster forming while lightening a load imposed on a cluster head. Moreover, fluctuations in the size of a cluster are small, and also the number of clusters can be reduced. The number of clusters is decreased by executing the cluster merging process, so that the number of clusters straddled at the time of routing can be reduced. Moreover, a throughput of an adhoc network can be improved by reducing process resources.

Comparison Example

Figure 1:
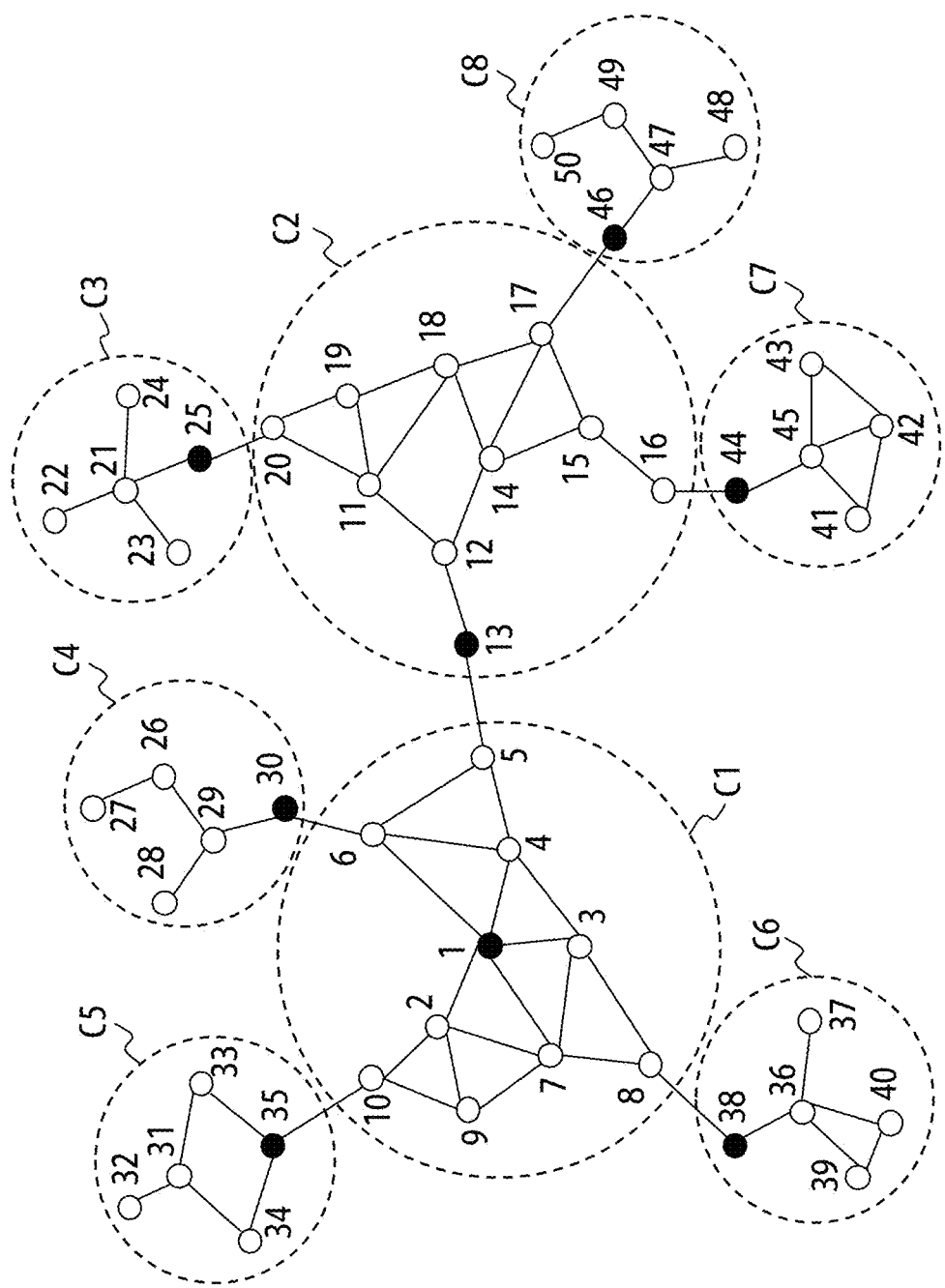
FIG. 1 illustrates an example of an adhoc network where clusters are formed.

FIG. 1 illustrates an example of an adhoc network where clusters are formed. The adhoc network illustrated in FIG. 1 includes 50 node apparatuses N1 to N50. Each of the node apparatuses holds unique identification information (ID). An identification number assigned to each of the node apparatuses is sometimes referred to as a "node ID". In this figure, the node apparatuses respectively have a node ID from 1 to 50. A node ID may be a MAC address.

In FIG. 2 and subsequent drawings as well as FIG. 1, node apparatus is sometimes referred to simply as a "node". A number or a sign assigned to each node is referred to also as a node ID. Adjacent node apparatuses among these node apparatuses are linked with a solid line. Moreover, when a node ID is designated with a numeral x, corresponding node apparatus is sometimes referred to simply as node apparatus Nx or a node Nx. Moreover, when anode ID is designated with a symbol y other than a numeral, corresponding node apparatus is sometimes referred to simply as node apparatus y or a node y.

Here, "adjacent" indicates that a plurality of node apparatuses are positioned in a distance where they are able to transmit and receive a packet. When two node apparatuses are adjacent, these two node apparatuses are referred to as node apparatuses connected with a link. Moreover, node apparatus that is positioned in coverage where the node apparatus is able to receive a packet transmitted from certain node apparatus is sometimes referred to as "adjacent node apparatus" or simply as an "adjacent node".

Each of the node apparatuses is, for example, a sensor. At this time, the adhoc network is referred to also as a sensor network. A wireless or wired connection of nodes with a link may be made.

Each of the node apparatuses does not always grasp information of adjacent nodes, and information about the entire network. Accordingly, each of the node apparatuses regularly transmits and receives, to and from an adjacent node, a message, such as a Hello message, including route information, and node information such as communication quality information of a link between nodes in order to learn how the local node is connected to a different node. The Hello message is transmitted from each node, for example, at time intervals of several seconds. However, a timing at which the Hello message is transmitted is not limited to the time intervals of several seconds but at arbitrarily certain time intervals, or the Hello message may be irregularly transmitted. With a transmission and reception of such a message, the communication quality of each route is calculated, so that a plurality of routes to a final destination are constructed based on a result of the calculation, and an optimal route is decided. Namely, the Hello message includes route information between a node that transmits the message and a node adjacent to the node, and node information such as communication quality information of a link between nodes, and the like. For example, a Hello packet transmitted from certain node apparatus is received by node apparatus adjacent to the node apparatus at the source. The Hello packet is used to notify route information of a network.

The example of the network illustrated in FIG. 1 is formed by using a method for generating a new cluster when the number of nodes of a cluster exceeds 10. When 50 node apparatuses reside as illustrated in FIG. 1, the node apparatuses can be grouped into 50/10=5 clusters so that the number of clusters within the entire network is minimized. In FIG. 1, however, the network is formed with eight clusters C1 to C8.

The clusters C1 to C8 respectively include cluster heads N1, N13, N25, N30, N35, N38, N44, and N46. Moreover, the cluster C1 includes node apparatuses N1 to N10. The cluster C2 includes node apparatuses N11 to N20. The cluster C3 includes node apparatuses N21 to N25. The cluster C4 includes node apparatuses N26 to N30. The cluster C5 includes node apparatuses N31 to N35. The cluster C6 includes node apparatuses N36 to N39. The cluster C7 includes node apparatuses N41 to N45. The cluster C8 includes node apparatuses N46 to N50.

Here, the "cluster head" is node apparatus that starts to generate a cluster, and generates a cluster including the local cluster head. The cluster head is sometimes referred to as an "originating node" or a "gateway (GW)".

Assume that the node apparatus N1 starts to generate a cluster. At this time point, assume that the node apparatuses N2 to N50 do not belong to any of the clusters. Node apparatus that does not belong to a cluster is sometimes referred to as a "free node".

The originating node broadcasts a Hello packet including an identifier (C1, C2, . . . , C8 or the like in FIG. 1) of a cluster being generated, and identifiers (ID numbers 1 to 10 indicating node apparatuses in the case of the cluster C1 illustrated in FIG. 1) of node apparatuses that participate in the cluster. The free node recognizes the identifier of the cluster being generated based on the Hello packet broadcast from the originating node. When the free node participates in a cluster, the free node generates a Hello packet including information that makes an association between an identifier of a cluster in which the free node desires to participate and an identifier of the local node, and broadcasts the generated Hello packet. For example, a case where the node apparatuses N1 to N50 reside as free nodes and the node apparatus N1 as an originating node generates a cluster is considered. In FIG. 1, the node apparatuses N2, N3, N4, N6, and N7 adjacent to the node apparatus N1 recognize that the cluster C1 is being generated by receiving the Hello packet transmitted from the originating node N1. Since the node apparatuses N2, N3, N4, N6, and N7 are free nodes that do not belong to a cluster, they decide to participate in the cluster C1 upon recognizing the identifier of the cluster C1 being generated. When the node apparatus N2 illustrated in FIG. 1 participates in the cluster C1, the node apparatus N2 generates a Hello packet including information that makes an association between the identifier C1 of the cluster in which the local node apparatus participates and the identifier N2 of the local node apparatus, and broadcasts the generated Hello packet.

When the identifier of the node apparatus is notified in association with the identifier of the cluster C1 being generated, the node apparatus N1 recognizes that a request to participate in the cluster C1 has been received. Accordingly, originating node N1 recognizes the node apparatus that participates in the cluster C1 being generated based on the received Hello packet, and adds the recognized node apparatus to the cluster. The node apparatus added to the cluster verifies that the local node apparatus has been added to the cluster based on the Hello packet from the originating node. Node apparatus that participates in a cluster is sometimes referred to as a "participation node". The participation node broadcasts a Hello packet including the identifier of the cluster in which the node participates. Upon recognizing the identifier of the cluster being generated from the Hello packet generated by the participation node, the free node participates in the cluster with the above described procedures. These processes are repeated until the number of node apparatuses included in the cluster reaches a threshold value.

The cluster C1 illustrated in FIG. 1 is a cluster generated when N1 is assumed to be an originating node, N2 to N50 are assumed to be the free nodes, and a threshold value of the number of node apparatuses included in the cluster is 10.

When the number of node apparatuses included in the cluster reaches the threshold value, the originating node broadcasts a Hello packet including information (a generation request or generation request information) for issuing a request to generate a new cluster. The participation node that has received the generation request generates a Hello packet including the received generation request, and broadcasts the generated packet. A free node that has received the Hello packet including the generation request operates as a new originating node, and starts to generate a cluster. In FIG. 1, the node apparatuses N13, N30, N35, and N38 respectively start to generate the clusters C2, C4, C5, and C6. Procedures after the clusters start to be generated are the same as those of the generation of the cluster C1. After the clusters are generated, each node apparatus stores, in a routing table, routes up to other node apparatuses within the same cluster.

In FIG. 1, the clusters are generated with a method for transmitting and receiving information used to generate a cluster with a Hello packet, and for generating another cluster when the number of node apparatuses included in a cluster reaches a threshold value.

By forming clusters as described above, each node apparatus does not need to store routes up to all node apparatuses included in an adhoc network. Accordingly, the size of a routing table stored in each node apparatus becomes smaller than that in a case where an adhoc network is not partitioned into clusters. Therefore, also the level of a load imposed by storing route information in each node apparatus is alleviated. Moreover, information used to form a cluster is transmitted and received with a Hello packet. Therefore, a bandwidth consumed by transmitting and receiving information in order to generate a cluster is narrower than that in a case where another packet, for example, a control packet is used.

However, in the example illustrated in FIG. 1, fluctuations in the number of nodes included in the clusters are such that five nodes in the cluster C3, and 10 nodes in the clusters C1 and C2. When this method is applied to a large-scale network including node apparatuses on the order of several thousands, the number of clusters straddled at the time of routing grows with an increase in the number of clusters, leading to a possible degradation of throughput.

Therefore, node apparatus in an adhoc network according to a disclosed embodiment generates a cluster in two stages such as a cluster generation process in the first stage and a cluster merging process in the second stage when a plurality of node apparatuses gather.

<Overall Description>

FIGS. 2A, 2B, and 2C are explanatory diagrams of an outline of the cluster forming process executed in stages. FIG. 2(A) is an explanatory diagram of an outline of the cluster generation process, which is the first stage of the cluster forming process for forming a cluster in stages, FIG. 2(B) is an explanatory diagram of the cluster merging process, which is the second stage of the cluster forming process, and FIG. 2(C) is an explanatory diagram of an example of results of the cluster merging process, which is the second stage of the cluster forming process.

Hereinafter, a process for creating a cluster by using a plurality of node apparatuses inclusive of the first and the second stages, and a process with which an originating node incorporate other node apparatuses in the first stage and makes a cluster grow until the first stage is terminated are sometimes referred to as "cluster forming" and "cluster generation", respectively.

In an embodiment disclosed below, the number of nodes that can be possibly included in a cluster differs in the cluster generation process in the first stage and the cluster merging process in the second stage. The number of nodes that can be possibly included in a cluster at the termination of the first stage, and the number of nodes that can be possibly included in a cluster at the termination of the second stage are referred to as a "tentative maximum number of cluster nodes" and a "maximum number of cluster nodes", respectively.

The maximum number of cluster nodes is larger than the tentative maximum number of cluster nodes. For example, the maximum number of cluster nodes is a value approximately twice the tentative maximum number of cluster nodes. The maximum number of cluster nodes is, for example, 10, 20, or 50. The maximum number of cluster nodes is not limited to these numbers as a matter of course. Moreover, a ratio of the tentative maximum number of cluster nodes to the maximum number of cluster nodes may possibly take an arbitrary value equal to or lower than 100 percent.

As illustrated in FIG. 2(A), the cluster generation process for generating a cluster and making the cluster grow so that the number of nodes of a cluster becomes equal to or smaller than the tentative maximum number of cluster nodes is executed in the first stage. Namely, also when the number of nodes of a cluster does not reach the maximum number of cluster nodes and there is a room to make the cluster grow, the cluster is not made to grow intentionally. Thereafter, the cluster forming makes a transition to the second stage where the cluster merging process for merging clusters generated in the first stage is executed. Both the cluster growing process in the first stage and the cluster merging process in the second stage are executed only by exchanging a Hello packet.

The cluster growing process and the cluster merging process are executed only by transmitting and receiving a Hello packet as described above, so that the number of clusters of a small size can be reduced, a load imposed on a network is alleviated, a load imposed on a cluster head can be lightened.

The ratio of the tentative maximum number of cluster nodes to the maximum number of cluster nodes is set to a higher percentage such as 75% or 80% when a priority is given to a speed at which a cluster is generated. Alternatively, the ratio is set to a lower percentage such as 40 percent, 35 percent or the like when a priority is given to the equality of the number of nodes within a cluster (a granularity of a cluster). The number of cluster nodes at the termination of the first stage is sometimes referred to as the tentative maximum number of cluster nodes. The ratio of the tentative maximum number of cluster nodes to the maximum number of cluster nodes is not limited to the above described numeric values.

After a specified amount of time elapses from a time point at which a participation request of a free node is no more issued to node apparatus, the merging process in the second stage is started. Each node apparatus takes a certain time interval, and determines that the cluster forming is stabilized if the number of node apparatuses that belong to a cluster does not change within the time interval. Then, the cluster forming makes a transition to the cluster merging process.

A cluster that has made a transition to the cluster merging process is merged if it can be merged with an adjacent cluster. A specified amount of time depends on the number of nodes of a cluster, and decreases as the size of a cluster reduces, namely, the number of nodes included in a cluster becomes smaller. Accordingly, a cluster of a smaller size starts to make a transition to the cluster merging process, leading to a higher possibility that the cluster of the smaller size is incorporated into another cluster.

In FIG. 2(B), a cluster 4 is merged with a cluster 1, clusters 6 and 7 are merged with a cluster 3, a cluster 8 is merged with a cluster 5, and a cluster 10 is merged with a cluster 9. The cluster merging process in the second stage starts at a cluster of a smaller size. In the first stage, a cluster where the number of nodes is equal to or smaller than the tentative maximum number of cluster nodes is generated. Therefore, a cluster of a smaller size is merged with a cluster of a size larger than the size of the local cluster. In FIG. 2(B), the number of clusters is 10. Also the cluster merging process in the second stage is executed only by exchanging a Hello packet as will be described later.

Each of the nodes is also able to start at the cluster merging stage by omitting the cluster generation stage. In this case, the granularity of a cluster is the minimum, namely, the number of nodes within a cluster is 1, and each node apparatus configures the cluster. In this case, all node apparatuses start to execute the cluster merging process simultaneously with startup. Namely, each of the node apparatuses functions as an originating node of a cluster composed of one node.

FIG. 2(C) illustrates a state where 10 clusters are reduced to 5 as a result of the cluster merging process.

<Configuration of Node Apparatus>

The node apparatus 10 that forms a cluster in two stages as described above when a plurality of clusters gather is described below.

For example, node apparatus that participates in a sensor network does not include sufficient resources in some cases. The node apparatus 10 has means for executing the cluster forming process including the cluster generation process and the cluster merging process only by transmitting and receiving a Hello packet. A special control packet is not used as described above, so that a load imposed on a network is alleviated, and the cluster forming can be performed while a load imposed on a cluster head is being lightened. The cluster merging process is preferentially started at a cluster where the number of nodes is smaller. The cluster merging process is executed, so that the number of clusters decreases, leading to a reduction in the number of clusters straddled at the time of routing. Moreover, process resources are reduced, so that a throughput of an adhoc network can be improved.

FIG. 3 is a functional block diagram illustrating an example of a configuration of the node apparatus 10. The node apparatus 10 includes a reception unit 102, a node type determination unit 104, a participation processing unit 106, a cluster information update unit 108, a cluster generation unit 110, a free node list generation unit 112, a cluster merge destination candidate notification unit 114, a cluster merge request acceptance unit 116, a cluster merge request update unit 118, a cluster merge list generation unit 120, a cluster merge processing unit 122, a cluster merge list notification unit 124, a setting unit 136, a Hello packet generation unit 138, and a transmission unit 140. Moreover, the node apparatus 10 stores node type information 126, cluster information 128, a free node list 130, a merge cluster list 132, and a merge node list 134. The node type information 126, the cluster information 128, the free node list 130, the merge cluster list 132 and the merge node list 134, and the node type information storage unit 126, the cluster information storage unit 128, the free node list storage unit 130, the merge cluster list storage unit 132 and the merge node list storage unit 134, which respectively store the above described information, are denoted with the same reference numerals.

The cluster information storage unit 128 stores apparatus identification information (identifiers of node apparatuses) of node apparatuses included in a cluster, which is a group of node apparatuses whose route information is stored by the local node apparatus among a plurality of node apparatuses within a network. Moreover, the cluster information 128 stores the maximum number of cluster nodes in addition to cluster information (CI).

The reception unit 102 receives a packet transmitted from adjacent node apparatus 10, and outputs a Hello packet to the node type determination unit 104. The reception unit 102 receives, from the adjacent node apparatus, a Hello packet used to notify route information of a route for conveying information within the network, and apparatus identification information of node apparatus included in a cluster, which is a group of node apparatuses whose route information is stored by the adjacent node apparatus.

The transmission unit 140 transmits a packet to adjacent node apparatus 10. For example, the transmission unit 140 transmits a Hello packet generated by the Hello packet generation unit 138 to the adjacent node apparatus. A packet transmission to all adjacent node apparatuses is sometimes referred to also as packet broadcasting.

Figure 4:
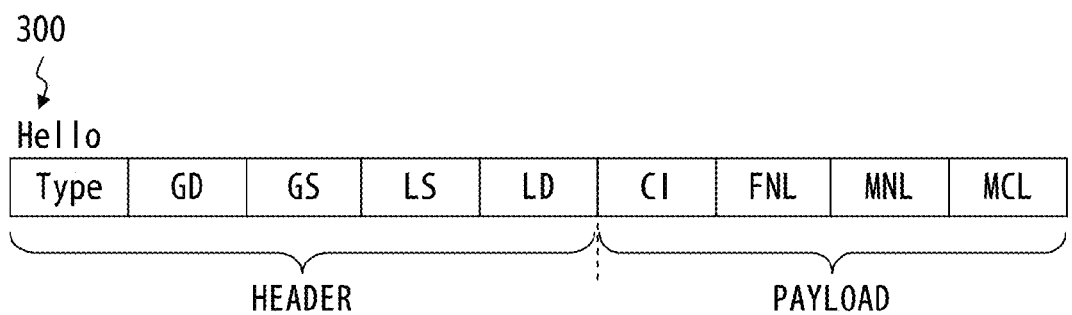
FIG. 4 illustrates an example of a format of a Hello packet.

FIG. 4 illustrates an example of a format of a Hello packet.

As illustrated in FIG. 4, a Hello packet 300 includes a header and a payload.

The header includes a Type field, a global destination (GD) field, a global source (GS) field, a local source (LS) field, and a local destination (LD) field.

The payload includes a cluster information (CI) field, a free node list (FNL) field, a merge node list (MNL) field, and a merge cluster list (MCL) field. The payload further includes information that represents the number of Hello headers, and the Hello headers, which are not illustrated. A Hello header includes route information. The route information includes an identifier of a GD for which a route is stored in a routing table of node apparatus that generates the Hello packet.

Hereinafter, the "global destination (GD)" indicates node apparatus 10 at a final destination of a packet, and the "local destination (LD)" indicates node apparatus 10 at a destination when a packet is transferred by one hop. The "local source (LS)" indicates node apparatus 10 at a source when a packet is transferred by one hop. The "global source (GS)" indicates node apparatus 10 at a source that initially creates a packet. A Hello packet is broadcast to node apparatus 10 adjacent to the node apparatus 10 at the source.

The type field stores information that indicates a type of data included in a payload. In the case of a Hello packet, a value that identifies the Hello packet is stored in the Type field. The reception unit 102 identifies the Hello packet by using the value stored in the Type field of the received packet, and outputs the packet to the node type determination unit 104.

In the cluster information (CI) field, an identifier of a cluster (cluster Identifier: CID) to which the local node apparatus 10 belongs, a list of identifiers (Node Identifiers: NIDs) of node apparatuses included in the cluster identified with the cluster identifier (CID), and an end flag are stored.

The number of identifiers (NIDs) of node apparatuses included in a cluster is arbitrary. A set of identifiers (NIDs) of a plurality of node apparatuses is sometimes represented as "{NID}".

The end flag included in the cluster information (CI) field is information that indicates whether new node apparatus is allowed to participate in a cluster identified with a cluster identifier (CID). Namely, the end flag is information that indicates whether the cluster identified with the cluster identifier (CID) includes node apparatuses by the maximum number of cluster nodes.

The maximum number of cluster nodes indicates the tentative maximum number of cluster nodes when node apparatus 10 is currently in the first stage of cluster forming, or indicates the maximum number of cluster nodes when the node apparatus 10 is currently in the second stage. "The maximum number of cluster nodes" simply referred to hereinafter is assumed to indicate the tentative maximum number of cluster nodes or the maximum number of cluster nodes depending on whether corresponding node apparatus is currently in either the first stage or the second stage of the cluster forming.

The end flag takes two values such as "true" and "false". "true" and "false" may be a sign including a numeral or a character indicating "true" or "false". When the end flag is "true", node apparatus 10 is not allowed to newly participate in a cluster. This is because the cluster already includes node apparatuses by the maximum number of cluster nodes. A Hello packet including cluster information where the end flag is "true" is used as a generation request, which is information for issuing a request to generate a new cluster. When the end flag is "false", the number of nodes included in a cluster does not reach the maximum number of cluster nodes. Therefore, new node apparatus is allowed to participate in the cluster including the node apparatus 10.

The free node list (FNL) field includes a list of cluster identifiers (CID) for respectively identifying a cluster in which a node is desired to participate, and an identifier (Node Identifier: NID, node ID) of node apparatus desired to participate in a cluster identified with a cluster identifier (CID). Information stored in the free node list (FNL) field is sometimes referred to as "free node information". The number of identifiers (NIDs) of node apparatuses desired to participate in a cluster is arbitrary. A set of identifiers (NIDs) of a plurality of node apparatuses is hereinafter represented as "{NID}" in some cases.

The merge node list (MNL) field and the merge cluster list (MCL) field are used for the cluster merging process in the second stage of the cluster forming.

When two clusters are merged by the cluster merging process, a Hello packet is transmitted and received between two adjacent node apparatuses A and B, which respectively belong to two different clusters. In this embodiment, when a cluster identifier (CID) is represented with a numerical value, a cluster having a cluster identifier (CID) having a smaller numerical value is assumed to be a master, and the other is assumed to be a slave. Assume that the node apparatus A is node apparatus belonging to a cluster on the master side, and the node apparatus B is node apparatus belonging to a cluster on the slave side.

The merge cluster list (MCL) field includes an identifier (S-Identifier: SID) of adjacent node apparatus that belongs to a cluster on the master side, and an identifier (NID) of node apparatus that belongs to a cluster on the slave side to which the local node apparatus belongs. Hereinafter, a set of identifiers (NIDs) of node apparatuses is sometimes represented as "{NID}".

When the node apparatus B receives a Hello packet as a cluster merge destination candidate notification from the node apparatus A that belongs to the cluster on the master side, the node apparatus B stores the identifier for identifying the node apparatus A as an identifier of the node apparatus (SID) that belongs to the cluster on the master side, and broadcasts a Hello packet by emptying a set of identifiers (NIDs) for identifying node apparatuses that belong to the cluster on the slave side.

The merge cluster list (MCL) field is a set of identifiers (NIDs) for identifying node apparatuses that belong to a cluster on the slave side, which includes the node apparatus B, when a Hello packet is transmitted and received as a cluster merge request notification within the cluster on the slave side to which the node apparatus B belongs.

In the merge node list (MNL) field, the set of identifier (NIDs) for identifying node apparatuses in the merge cluster list (MCL) field is moved and stored when the number of elements of the set of identifiers (NIDs) for identifying the node apparatuses listed up in the merge cluster list (MCL) field matches node apparatuses that belong to the cluster on the slave side. Namely, in the merge node list (MNL) field, a list of all node apparatuses that can be merged with a cluster on the master side and belong to the cluster on the slave side is stored. When the node apparatus B broadcasts a Hello packet as a cluster merge request notification, the merge node list (MNL) is a set of identifiers (NIDs) for identifying the node apparatuses that belong to the cluster on the slave side, which includes the node apparatus B.

The setting unit 136 sets the node apparatus 10 as a free node, an originating node, or a participation node, and stores information for identifying the type of the node apparatus 10 in the node type information 126.

The node type information 126 is information in an arbitrary form for identifying the type of the node apparatus 10. When the local node is set as an originating node, the cluster information 128 is updated.

When a Hello packet is transferred from the reception unit 102, the node type determination unit 104 obtains, from the node type information 126, the type of the node apparatus 10, namely, any of the free node, the originating node and the participation node. In the node type determination unit 104, an association is made among the type of the node and output destinations of the cluster information (CI), the free node information (FNL or the like), the merge cluster list (MCL), and the merge node list (MNL) within the Hello packet. As illustrated in FIG. 3, the node type determination unit 104 transmits the cluster information (CI) to the participation processing unit 106 by referencing the node type information 126 when the node apparatus 10 is a free node. Moreover, the node type determination unit 104 transmits the cluster information (CI) to the cluster information update unit 108 by referencing the node type information 126 when the node apparatus 10 is an originating node or a participation node. Additionally, the node type determination unit 104 transmits the free node information (FNL or the like) to the cluster generation unit 110 by referencing the node type information 126 when the node apparatus 10 is an originating node, or transmits the free node information to the free node list generation unit 112 when the node apparatus 10 is a participation node. Similarly, the merge cluster list (MCL) is transmitted to the cluster merge request acceptance unit 116 when the node apparatus 10 is an originating node, or to the cluster merge request update unit 118 when the node apparatus 10 is a participation node. The merge node list (MNL) is transmitted to the cluster merge processing unit 122 when the node apparatus 10 is an originating node, or to the cluster merge list notification unit 124 when the node apparatus 10 is a participation node.

The participation processing unit 106 verifies the request to participate in the cluster and the participation in the cluster. Upon receipt of the Hello packet when the node apparatus 10 is the free node, the participation processing unit 106 receives cluster information (CI) included in the Hello packet. When the participation processing unit 106 receives the cluster information (CI), the participation processing unit 106 verifies a cluster identifier ({NID}) included in the cluster information (CI), and content of an end fag. Moreover, the participation processing unit 106 verifies whether an entry including the apparatus identifier of the local node apparatus 10 is stored in the free node list 130. When the node apparatus 10 has already issued the request to participate in the cluster, the entry including the identifier of the local node apparatus 10 is stored in the free node list 130.

When the entry including the identifier of the local node apparatus 10 is not stored in the free node list 130, the local node apparatus 10 does not issue the request to participate in the cluster. Accordingly, the participation processing unit 106 stores, in the free node list 130, a pair of the cluster identifier (CID) included in the cluster information (CI) and the identifier of the local node apparatus 10 (node ID) in order to issue the request to participate in the cluster in which the local node apparatus 10 is allowed to participate, namely, the cluster having the end flag that is not "true". When the entry including the identifier of the local node apparatus 10 is stored in the free node list 130, the local node apparatus 10 has already issued the request to participate in the cluster. Accordingly, the participation processing unit 106 checks whether the cluster information (CI) includes the identifier of the node apparatus 10 in order to verify whether the node apparatus 10 was allowed to participate in the cluster. When the cluster information (CI) includes the identifier of the node apparatus 10, the participation processing unit 106 determines that the local node apparatus 10 was allowed to participate in the cluster, and updates the set of identifiers "{NID}" of node apparatuses included in the cluster information (CI). At the same time, the participation processing unit 106 deletes the identifier of the node apparatus 10 from the free node list 130, so that the local node becomes a participation node of the cluster. When the cluster information (CI) does not include the identifier of the local node apparatus 10, the participation processing unit 106 checks the end flag in order to verify whether the local node apparatus 10 is allowed to participate in a cluster identified with a cluster identifier (CID) included in the cluster information (CI).

When the end flag included in the cluster information (CI) is "true", the participation processing unit 106 deletes the entry of the free node list 130. This is because the cluster to which the local node apparatus 10 belongs already includes node apparatuses by the maximum number of cluster nodes. Upon receipt of a Hello packet including cluster information (CI) where the end flag is "true" when the free node list 130 does not include the entry that includes the identifier of the local node apparatus 10, the participation processing unit 106 designates the local node apparatus 10 as an originating node, changes the node type information 126, and updates the cluster information 128.

The cluster information update unit 108 checks whether a cluster identifier (CID) included in the cluster information (CI) and the cluster identifier (CID) of the cluster to which the local node apparatus 10 belongs match in order to verify whether the cluster information (CI) notified with the Hello packet is information about the cluster to which the local node apparatus 10 belongs. When the identifiers match, information of the cluster to which the local node apparatus 10 belongs is notified. Therefore, the cluster information update unit 108 updates the cluster information 128 based on the cluster information (CI) notified with the Hello packet. Moreover, the cluster information update unit 108 deletes the entry of the node apparatus included in the cluster information (CI) from the free node list 130.

Additionally, the cluster information update unit 108 makes a comparison with the merge node list (MNL) or the merge cluster list (MCL) when the local node apparatus 10 is set in the cluster information (CI), and updates the merge cluster list 132 and the merge node list 134 as needed.

Furthermore, the cluster information update unit 108 transmits the cluster information (CI) received from the node type determination unit 104 to the cluster merge destination candidate notification unit 114.

Moreover, the cluster information update unit 108 also functions as a cluster node change verification unit that verifies whether a ratio of the number of node apparatuses included in a cluster to the maximum number of cluster nodes defined with a specified integer value is equal to or lower than a specified ratio, and whether the number of node apparatuses does not change for a specified amount of time.

The cluster generation unit 110 processes node free information such as the node free list (FNL) or the like received from the node type determination unit, and references and updates the cluster information (CI) managed by the local node as needed.

The free node list generation unit 112 processes the free node list (FNL) received from the node type determination unit 104, and updates the free node list 130 managed by the local node apparatus 10 as needed.

The cluster merge destination candidate notification unit 114 references the cluster information (CI) 128 received from the cluster information update unit 108 and the cluster information 128 managed by the local node, and updates the merge cluster list 132 managed by the local node when a condition of cluster merging is satisfied. Moreover, when the cluster merge destination candidate notification unit 114 updates the merge cluster list 132, and passes the merge cluster list (MCL) to the cluster merge request acceptance unit 116 when the local node is an originating node.

The cluster merge request acceptance unit 116 processes the merge cluster list (MCL) received from the node type determination unit 104 or the cluster merge destination candidate notification unit 114, and updates the merge cluster list 132 managed by the local node when the condition of the cluster merging is satisfied.

The cluster merge request update unit 118 processes the merge cluster list (MCL) received from the node type determination unit 104, and updates the merge cluster list 132 managed by the local node (registers the local node as a participation node on the slave side) when the condition of the cluster merging is satisfied. Moreover, when the local node is an opposed node on the master side, the cluster merge request update unit 118 passes the merge cluster list (MCL) and the cluster information (CI) to the cluster merge list generation unit 120.

The cluster merge list generation unit 120 processes the merge cluster list (MCL) and the cluster information (CI), which are received from the cluster merge request update unit 118, and updates the merge node list 134 managed by the local node when the condition of the cluster merging is satisfied.

The cluster merge processing unit 122 processes the merge node list (MNL) received from the node type determination unit 104, and updates the cluster information 128 managed by the local node when the condition of the clustering merging is satisfied.

The cluster merge processing unit 122 includes a merge cluster node number determination unit that obtains the number of node apparatuses included in a first cluster from apparatus identification information stored in the cluster information storage unit of the local node upon receipt of a Hello packet from one of node apparatuses included in a second cluster different from the first cluster, obtains the number of node apparatuses included in the second cluster based on information included in a Hello packet, and determines whether a sum of the number of node apparatuses included in the first cluster and that of node apparatuses included in the second cluster is equal to or smaller than the maximum number of cluster nodes. Then, the cluster merge processing unit 122 updates the apparatus identification information stored in the cluster information storage unit by adding apparatus identification information of the node apparatuses included in the second cluster to that of the node apparatuses included in the first cluster based on results of the determination of the merge cluster node number determination unit, and merges the second cluster with the first cluster.

The cluster merge list notification unit 124 processes the merge node list (MNL) received from the node type determination unit, and references and updates the merge node list 134 managed by the local node as needed.

The Hello packet generation unit 138 generates a Hello packet, and transmits the generated packet to the transmission unit 140. An example of a format of the Hello packet is illustrated in FIG. 4. The Hello packet includes a cluster information (CI) field, a free node list (FNL) field, a merge node list (MNL) field, and a merge cluster list (MCL) field. Information stored in these fields are obtained respectively from the cluster information 128, the free node list 130, the merge node list 134, and the merge cluster list 132.

<Example of Operations>

An example of operations of the node apparatus 10 is described with reference to FIGS. 5 to 13.

The cluster merging process, which is the second stage of the cluster forming process, is described below.

A transition from the cluster generation process, which is the first stage of the cluster forming process, to the cluster merging process, which is the second stage, is made in units of node apparatuses. Each of the node apparatuses 10 monitors whether the number of node apparatuses within a cluster to which the local node belongs changes, and starts the cluster merging process when the number of node apparatuses within the cluster does not change for a specified amount of time. For example, a certain amount of time is waited from the time point when the number of nodes of the cluster to which the local node belongs no more changes. At the time point when the specified amount of time is waited, a cluster where the number of nodes is smaller times out earlier than a cluster where the number of nodes is larger, and the cluster where the number of nodes is smaller makes a transition to the cluster merging stage and a cluster merge request arrives at the cluster earlier. Namely, the cluster merging process preferentially starts at the cluster where the number of nodes is smaller among adjacent clusters.

Figure 5:
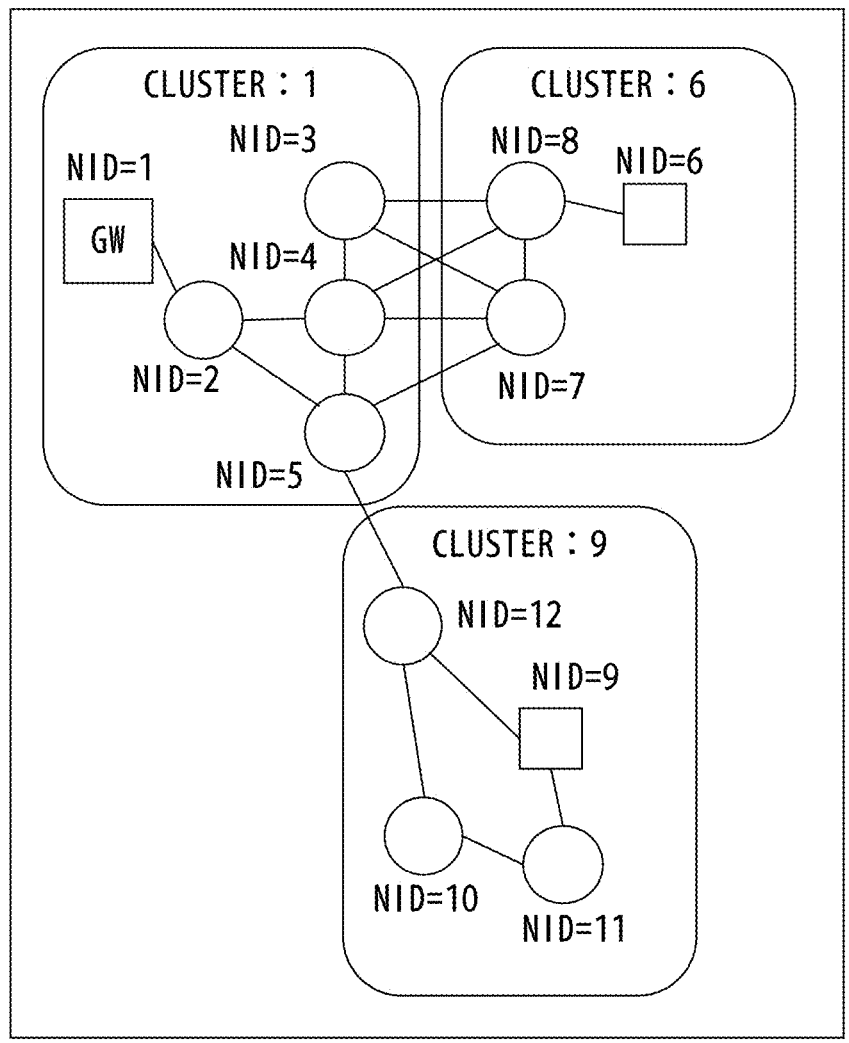
FIG. 5 is an explanatory diagram of an outline of a cluster merge priority decision process.

FIG. 5 is an explanatory diagram of an outline of the cluster merging priority decision process for deciding at which cluster the cluster merging process starts when a plurality of clusters reside.

As illustrated in FIG. 5, the cluster 1 includes five node apparatuses each having an identifier of any of NIDs=1 to 5, the cluster 6 includes three node apparatuses each having an identifier (NID) of any of NIDs=6 to 8, and the cluster 9 includes four node apparatuses each having an identifier (NID) of any of NIDs=9 to 12. An originating node of the cluster 1 is the node apparatus having NID=1, an originating node of the cluster 6 is the node apparatus having NID=6, and an originating node of the cluster 9 is the node apparatus having NID=9.

In this case, the cluster 6 is the smallest among the three clusters, namely, the cluster including the smallest number of node apparatuses. Accordingly, the cluster 6 makes a transition to the cluster merging stage earlier than the clusters 1 and 9. A transition from the cluster generation process, which is the first stage of the cluster forming process, to the cluster merging process, which is the second stage, is made by changing a value of the maximum number of cluster nodes, which is set in the first stage, and by changing the end flag stored in the cluster information 128 of the node apparatus 10 from "true" to "false".

Figure 6:
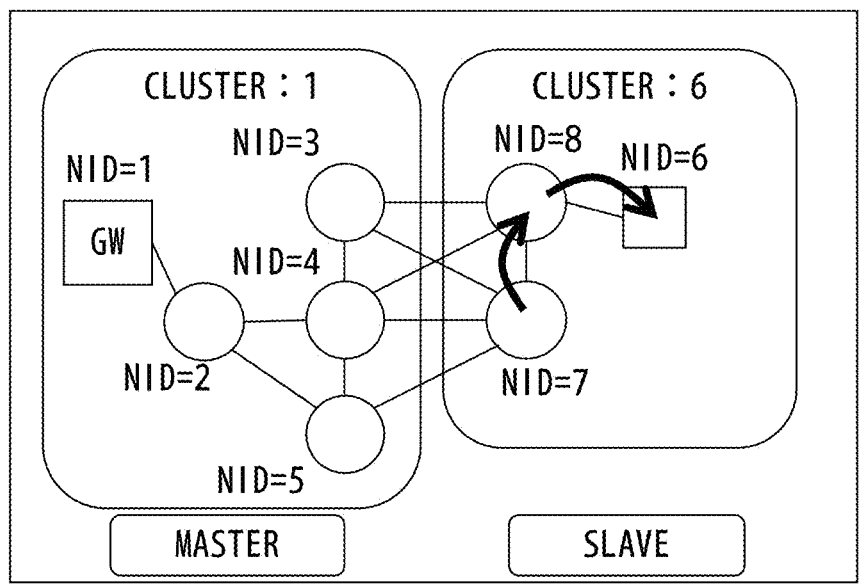
FIG. 6 is an explanatory diagram of an outline of a cluster merge destination candidate notification process.

FIG. 6 is an explanatory diagram of an outline of the cluster merge destination candidate notification process.

The cluster merging process is executed between adjacent clusters. A transmission and reception of a Hello packet to and from an adjacent cluster is performed between opposed node apparatuses, which belong to adjacent clusters and are two adjacent node apparatuses. By way of example, for the nodes illustrated in FIG. 6, a pair of the node apparatus having NID=3 belonging to the cluster 1 and the node apparatus having NID=7 or 8 belonging to the cluster 6 is a pair of such opposed node apparatuses.

In the cluster merge destination candidate notification process, upon receipt of a Hello packet from opposed node apparatus that belongs to an adjacent cluster, node apparatus that has received the Hello packet adds up the numbers of node apparatuses in both of the clusters based on cluster information (CI) managed by the local node and cluster information (CI) included in the Hello packet, and determines whether the added number reaches the maximum number of cluster nodes. When the added number of nodes is equal to or smaller than the maximum number of cluster nodes, it is determined that the two clusters are allowed to be merged.

At this time, the cluster merge destination candidate notification unit 114 of the local node apparatus 10 decides the cluster to which the local node apparatus belongs and the adjacent cluster as a slave and a master, respectively. In this example, a comparison is made between a value of the identifier of the cluster (CID) to which the local node apparatus belongs and that of the adjacent cluster, and the cluster having a smaller value of the identifier of the cluster (CID) is decided as a master, and the cluster having a larger value of the identifier is decided as a slave. In the example illustrated in FIG. 6, the clusters 1 and 6 are decided as a master and a slave, respectively.

When the node apparatus having NID=7 of the cluster 6 (the cluster on the slave side) receives a Hello packet from the node apparatus having NID=3 of the cluster 1 (the cluster on the master side) and it is determined that the cluster 6 and the cluster 1 are allowed to be merged, the cluster merge request update unit 118 of the opposed node of the cluster on the slave side, namely, the node apparatus having NID=7 changes the merge cluster list 132 of the local node apparatus as follows.

<SID, {NID}>=<3,{ }>

As illustrated in FIG. 6, for example, the node apparatus N7 of the cluster 6 is opposed to three node apparatuses such as node apparatus N3, node apparatus N4 and node apparatus N5 as adjacent nodes that belong to the cluster 1, namely, opposed node apparatuses. When a plurality of opposed node apparatuses reside as in this example, there is a possibility that redundant cluster merge destination candidate notifications reach the originating node N6 of the cluster 6. Accordingly, a transmission of a cluster merge destination candidate notification may be arbitrarily restricted within a cluster. For example, when a node ID is represented with a numeral, a pair having a minimum sum of an ID of node apparatus in a cluster on the slave side and that of node apparatus in a cluster on the master side among pairs of opposed node apparatuses may be selected as a pair of opposed node apparatuses.

FIG. 7 illustrates information stored in the merge cluster list (MCL) field of the Hello packet transmitted by the node apparatus having NID=7 of the cluster 6. The Hello packet generation unit 138 obtains this information from the merge cluster list 132. In the merge cluster list (MCL) field of the Hello packet transmitted by the node apparatus having NID=7 of the cluster 6, "<3, { }>" is stored, and the Hello packet as a cluster merge destination candidate notification is broadcast from the transmission unit 140.

The Hello packet broadcast from the node apparatus having NID=7 of the cluster 6 to the cluster 6 is received by the node apparatus having NID=6, which is the originating node of the cluster C6, via the node apparatus having NID=8 adjacent to the node apparatus having NID=7.

FIG. 8 illustrates operations after an originating node on the slave side receives a cluster merge destination candidate notification. In this case, the originating node on the slave side is node apparatus having NID=6.

The cluster merge request acceptance unit 116 of the node apparatus having NID=6 determines whether the cluster merge destination candidate notification has been received from a different cluster. This determination can be performed by judging whether a value has already been stored as an SID in the merge cluster list 132 of the node apparatus 10 having NID=6. When the value has not been stored yet as the SID in the merge cluster list 132 of the node apparatus 10 having NID=6, the cluster merge destination candidate notification is accepted, and an identifier of node apparatus of the cluster C1 adjacent to the cluster C6 is set as the SID of the merge cluster list 132. Namely, SID=3 is set in the merge cluster list 132 of the node apparatus 10 having NID=6.

Next, the cluster merge request update unit 118 of the node apparatus 10 having NID=6 makes the Hello packet generation unit 138 generate a Hello packet for notifying all the nodes within the cluster 6 to which the local node apparatus belongs that the cluster merging is being requested. Specifically, the originating node of the cluster of the slave, namely, the identifier of the node apparatus having NID=6 is set as the identifier of the node apparatus in the merge cluster list 132, and a Hello packet using this identifier is generated. In the cluster information (CI) field of this Hello packet, <CID,{NID},end>=<6,{6,7,8},false> is stored. Moreover, in the merge cluster list (MCL) field,

<SID, {NID}>=<3,{6}> is stored.

Thereafter, the Hello packet generated by the Hello packet generation unit 138 of the node apparatus 10 having NID=6 is transmitted from the transmission unit 140.

Each of the node apparatuses within the cluster C6 on the slave side, which has received the Hello packet from the node apparatus having NID=6, recognizes that the cluster merge request has been accepted by learning that the value indicating the originating node of the cluster to which the local node belongs, namely, the identifier of the node apparatus having NID=6 is set. Then, the identifier of the local node apparatus is set in a set of identifiers MIDI of node apparatuses in the merge cluster list 132, and the Hello packet including the merge cluster list (MCL) field to which the identifier of the local node apparatus is added is transmitted. An example of the cluster information (CI) field and the merge cluster list (MCL) field of the Hello packet is illustrated in FIG. 9A.

All the nodes of the cluster on the slave side are finally listed up in the set of identifiers ({NID}) of node apparatuses in the merge cluster list (MCL) field of the Hello packet.

FIG. 9B illustrates an example of a Hello packet transmitted from the node apparatus having NID=7 to the node apparatus having NID=3. In a cluster information (CI) field and a merge cluster list (MCL) field of this Hello packet, CI:<CID,{NID},end>=<6,{6,7,8},false>
MERGE CLUSTER LIST (MCL):<SID,{NID}>=<3,{6,7,8}> are stored.

FIG. 9C illustrates an example of a Hello packet transmitted from the node apparatus having NID=3, which belongs to the cluster on the master side and has received the Hello packet including a cluster information (CI) field and a merge cluster list (MCL) field as illustrated in FIG. 9B.

The node apparatus having NID=3 determines whether the number of elements of the set of identifiers "{NID}" of node apparatuses in the merge cluster list (MCL) field included in the cluster merge request notification (the Hello packet illustrated in FIG. 9B) and that of node apparatuses included in the cluster information (CI) field match. If the numbers match, the cluster merge list generation unit 120 changes the merge node list 134 of the node apparatus having NID=3 based on the merge cluster list (MCL). Then, the Hello packet generation unit 138 of the node apparatus having NID=3 generates a Hello packet where the cluster information (CI) field, the merge node list (MNL) field, and the merge cluster list (MCL) field are respectively
CI:<CID,{NID},end>=<1,{1,2,3,4,5},false>
MNL:<{NID}>=<{6,7,8}>
MCL:<SID,{NID}>=<,{ }>
and broadcasts the generated packet from the transmission unit 140 of the node apparatus having NID=3. At this time, the Hello packet transmitted and received within the cluster 1 has a meaning of a cluster merge request notification.

Figure 10:
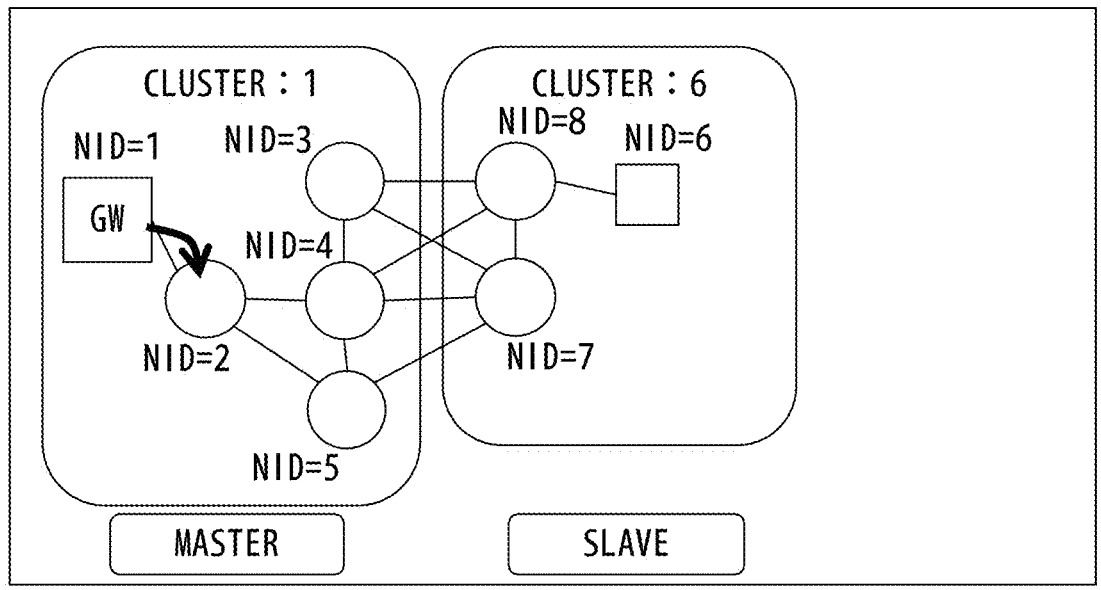
FIG. 10 is an explanatory diagram of an outline of a cluster merge request acceptance process executed in a cluster merge request acceptance processing unit.

FIG. 10 illustrates an example of operations of each of the node apparatuses within the cluster C1 after the node apparatus having NID=3 of the cluster C1, which is the cluster on the master side, broadcasts the Hello packet illustrated in FIG. 9C.

The originating node (the node apparatus having NID=1) of the cluster C1, which is the cluster on the master side, verifies whether a cluster merge destination candidate notification from a different cluster has been received, and whether a total of the number of elements of identifiers "{NID}" of node apparatuses included in the merge node list (MNL) field and the number of node apparatuses within the cluster to which the local node belongs is equal to or smaller than the maximum number of cluster nodes. When these conditions are satisfied, cluster merging is performed by adding the node apparatuses included in the merge node list (MNL) field to the cluster information (CI). Then, the Hello packet generation unit 138 of the node apparatus having NID=1 generates a Hello packet where the cluster information (CI) field, the merge node list (MNL) field, and the merge cluster list (MCL) field are respectively
CI:<CID, {NID}, end>=<1, {1, 2, 3, 4, 5, 6, 7, 8}, false>
MNL:<{NID}>=<{ }>
MCL:<SID,{NID}>=<,{ }>

Figure 11:
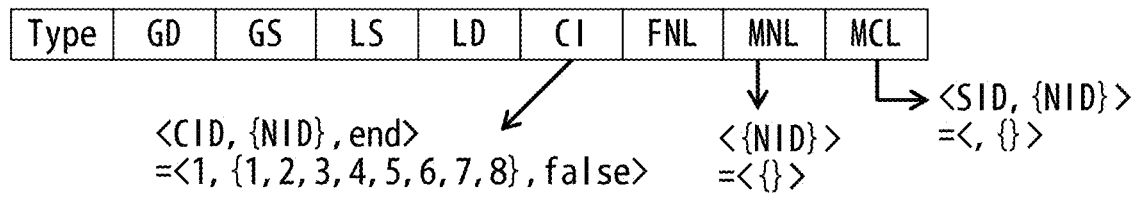
FIG. 11 illustrates an example of a Hello packet broadcast with a process executed in the cluster merge request acceptance processing unit.

FIG. 11 illustrates an example of such a Hello packet. The transmission unit 140 of the originating node (the node apparatus having NID=1) of the cluster 1 broadcasts the Hello packet illustrated in FIG. 11.

The originating node (the node apparatus having NID=1) of the cluster C1, which is the cluster on the master side, verifies whether a cluster merge destination candidate notification from a different cluster has been received, and whether a total of the number of elements of the set of identifiers ({NID}) of node apparatuses included in the merge node list (MNL) field and the number of node apparatuses within the cluster to which the local node belongs is equal to or smaller than the maximum number of cluster nodes. When these conditions are satisfied, cluster merging is performed by adding the node apparatuses included in the merge node list (MNL) field to the cluster information (CI), so that the new cluster 1 is formed. Then, the Hello packet generation unit 138 of the node apparatus having NID=1 generates a Hello packet where the cluster information (CI) field, the merge node list (MNL) field, and the merge cluster list (MCL) field are respectively
CI:<CID,{NID},end>=<1, {1, 2, 3, 4, 5, 6, 7, 8}, false>
MNL:<{NID}>=<{ }>
MCL:<SID,{NID}>=<,{ }>

The originating node of the new cluster 1 is node apparatus having NID=1, and node apparatuses included in the cluster are identified with NIDs=1 to 8. Moreover, when a total of the number of elements of the set ({NID}) of identifiers of the node apparatuses included in the merge node list (MNL) field and the number of node apparatuses within the cluster to which the local node belongs exceeds the maximum number of cluster nodes, the end flag results in "true", and the cluster merging is not performed.

FIG. 12 is an explanatory diagram of operations of node apparatus after the originating node (the node apparatus having NID=1) of the cluster C1, which is the cluster on the master side, transmits the above described Hello packet including the cluster information (CI) field.

When the Hello packet is transmitted from the originating node (the node apparatus having NID=1) of the cluster on the master side, each of the node apparatuses (the node apparatuses having NID=1, 2, 3, 4, 5), which belonged to the cluster on the master side, recognizes that the clusters have been merged if the identifiers (NIDs) of the node apparatuses, which are stored in the merge node list 134 managed by the local node, are included in the cluster information (cI) field, and deletes an identifier (NID) of the node apparatus, which matches any of the identifiers (NIDs) of the node apparatuses stored in the merge node list 134, from the merge node list 134. Then, each of the node apparatuses rewrites the cluster information 128 of the local node. Namely, in the cluster information 128, the following information is stored.
CI:<CID,{<NID,SN>},end>=<1, {1, 2, 3, 4, 5, 6, 7, 8}, false>

After the cluster information 128 of all the node apparatuses (NID=1, 2, 3, 4, 5, 6, 7, 8) have been rewritten, the cluster merging process is ended.

Figure 13:
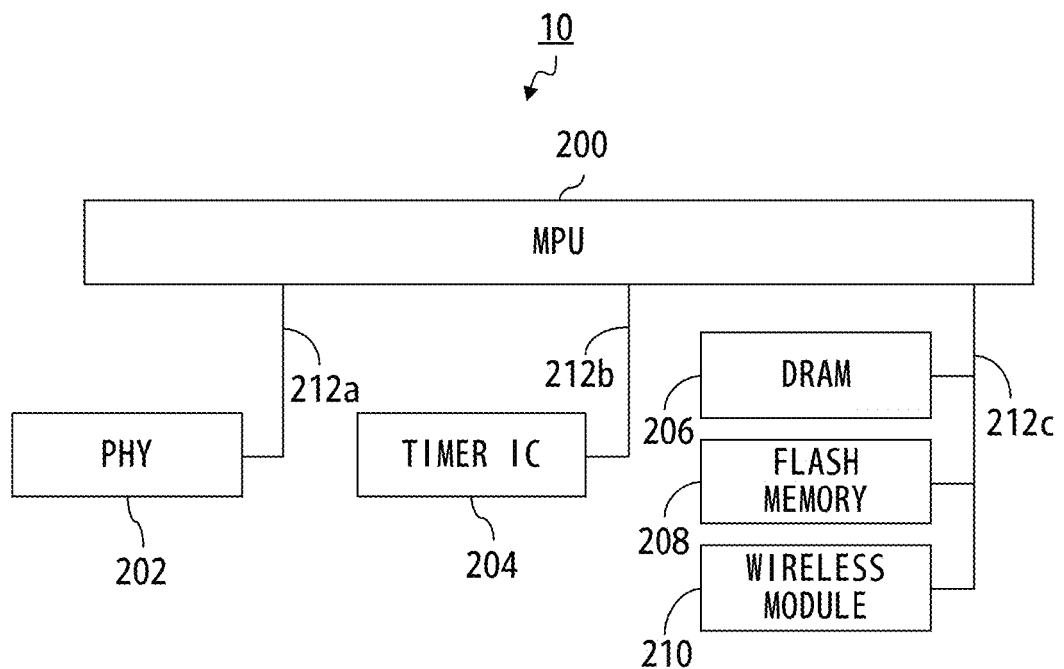
FIG. 13 is a block diagram illustrating an example of a hardware configuration of node apparatus.

FIG. 13 illustrates an example of a hardware configuration of the node apparatus 10.

The node apparatus 10 includes an MPU (Micro Processing Unit) 200, a PHY (Physical Layer) chip 202, a timer IC 204, a DRAM (Dynamic Random Access Memory) 206, a flash memory 208, and a wireless module 210. The MPU 200, the PHY chip 202, the timer IC 204, the DRAM 206, the flash memory 208, and the wireless module 210 are interconnected by a bus 201 (201a to 201c), and are able to exchange various types of data under the control of the MPU 200.

The MPU 200 (processor) is an arithmetic processing unit that controls operation of the entire computer 200, and functions as a control processing unit of the computer 200. The MPU 202 operates as the node type determination unit 104, the participation processing unit 106, the cluster information update unit 108, the cluster generation unit 110, the free node list generation unit 112, the cluster merge destination candidate notification unit 114, the cluster merge request acceptance unit 116, the cluster merge request update unit 118, the cluster merge list generation unit 120, the cluster merge processing unit 122, the cluster merge list notification unit 124, the setting unit 136, and the Hello packet generation unit 138.

The flash memory 208 is a nonvolatile memory in which a specified basic control program such as firmware or the like is prerecorded. The MPU 200 reads and executes this basic control program at startup of the computer 200, so that the operations of the components of the computer 200 are enabled to be controlled.

The DRAM 206 is a semiconductor memory that is readable and writable as needed and the MPU 202 uses as a working storage area on demand when the MPU 202 executes various types of control programs. The DRAM 206 is able to store the node type information 126, the cluster information 128, the free node list 130, the merge cluster list 132, the merge node list 134, and a routing table. However, the node type information 126 may be stored in the flash memory 208. In this case, the node type information 126 stored in the flash memory 208 is read into the DRAM 206 after startup.

The PHY chip 202 and the wireless module 210 operate as the reception unit 102 and the transmission unit 140. The PHY chip 202 is optional. By providing the PHY chip 202, a communication using a line can be performed.

The timer IC 204 measures a time at which a Hello packet is transmitted, a time during which the number of node apparatuses included in a cluster to which the node apparatus 10 belongs does not change, and the like.

A program such as firmware and the like may be recorded on a computer-readable recording medium and provided to the node apparatus 10. The MPU 202 is also able to read and execute a specified control program recorded on a computer-readable recording medium. Examples of the computer-readable recording medium include a flash memory, for example, provided with a connector of a USB (Universal Serial Bus) standard, a CD-ROM (Compact Disc Read Only Memory), a DVD-ROM (Digital Versatile Disc Read Only Memory), and the like. Moreover, the program may be installed in the node apparatus 10 by being downloaded from the network via the PHY chip 202 or the wireless module 210. The node apparatus 10 may be implemented with a computer.

<Processes in Node Apparatus>

FIG. 14 is a flowchart for explaining operations of the node type determination unit 104.

In step S102, the node type determination unit 104 determines whether the local node apparatus 10 is a free node by referencing the node type information 126 when a Hello packet is input from the reception unit 102. When this determination results in "YES", namely, when the local node apparatus 10 is a free node, the flow proceeds to step S104. When this determination results in "NO", namely, when the local node apparatus 10 is not a free node, the flow proceeds to step S106.

In step S104, the node type determination unit 104 notifies the participation processing unit 106 of cluster information (CI) including information indicating that the local node apparatus 10 is a free node. After the process of step S104 is terminated, the process of the node type determination unit 104 is ended.

In step S106, the node type determination unit 106 notifies the cluster information update unit 108 of the cluster information (CI) including the information indicating that the local node apparatus 10 is not a free node.

In step S108 next to step S106, the node type determination unit 106 determines whether the local node apparatus 10 is an originating node by referencing the node type information 126. When this determination results in "YES", namely, when the local node apparatus 10 is an originating node, the flow proceeds to step S110. Alternatively, when this determination results in "NO", namely, when the node apparatus 10 is not an originating node, the flow proceeds to step S116.

In step S110, the node type determination unit 106 notifies the cluster generation unit 110 of a free node list (FNL). Then, the flow proceeds to step S112.

In step S112, the node type determination unit 106 notifies the cluster merge request acceptance unit 116 of the merge cluster list (MCL).

In step S114 next to step S112, the node type determination unit 106 notifies the cluster merge processing unit 122 of the merge node list (MNL). A process order of steps S110, S112, and S114 is arbitrary. After the process of step S114 is terminated, the process of the node type determination unit 104 is ended.

In step S116, the node type determination unit 106 10 notifies the free node list generation unit 112 of the free node list (FNL). Then, the flow proceeds to step S118.

In step S118, the node type determination unit 106 notifies the cluster merge request update unit 118 of the merge cluster list (MCL).

In step S120 next to step S118, the node type determination unit 106 notifies the cluster merge list notification unit 124 of the merge node list (MNL). A process order of steps S116, S118, and S120 is arbitrary. After the process of step S114 is terminated, the process of the node type determination unit 104 is ended.

Figure 15:
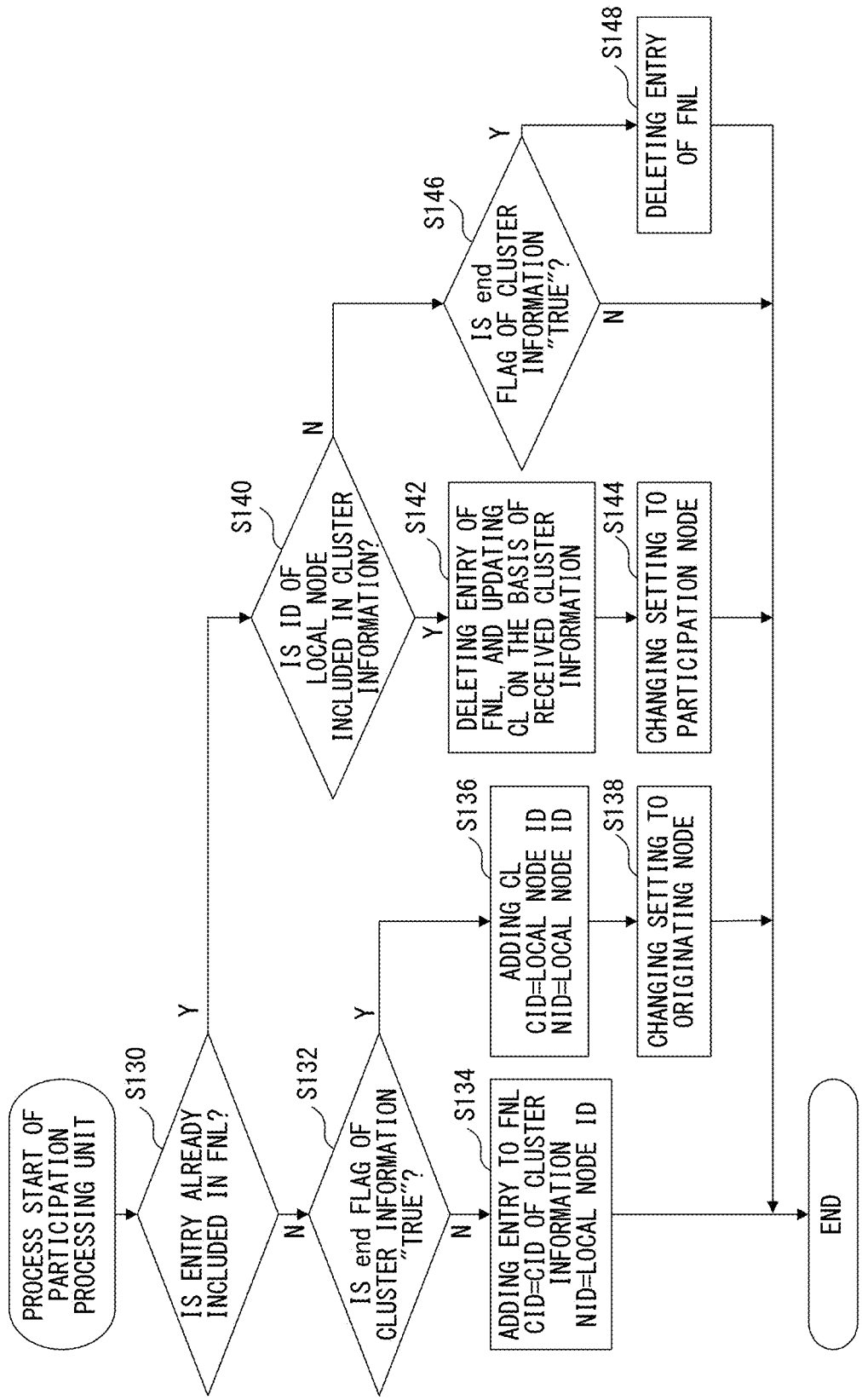
FIG. 15 is a flowchart illustrating an example of a flow of a process executed in a process executed in a participation processing unit.

FIG. 15 is a flowchart illustrating an example of operations of the participation processing unit 106.

In step S130, the participation processing unit 106 determines whether an entry of the local node is included in the free node list 130. When the entry of the local node is included in the free node list 130, the flow proceeds to step S140. When the entry of the local node is not included in the free node list 130, the flow proceeds to step S132.

In step S132, the participation processing unit 106 determines whether an end flag included in a cluster information (CI) field of a Hello packet is "true". When the end flag is "true", the flow proceeds to step S136. When the end flag is not "true", the flow proceeds to step S134.

In step S134, the number of nodes within the cluster does not reach the maximum number of cluster nodes. Therefore, the participation processing unit 106 stores, in the free node list 130, the identifier (NID) of the local node apparatus in association with a cluster identifier (CID) included in the cluster information (CI). After the process of step S134 is terminated, the process of the participation processing unit is ended.

In step S136, the participation processing unit 106 generates cluster information 128 so that the local node apparatus is able to operate as an originating node. At this time, the identifier of the local node apparatus is stored as a cluster identifier (CID) in the cluster information 128, and a newly created cluster includes the local node. Then, the flow proceeds to step S138.

The participation processing unit 106 changes the setting of the local node apparatus to an originating node in step S138. After the process of step S138 is terminated, the process of the participation processing unit 106 is ended.

In the meantime, when the determination in step S130 results in "YES" (Y), namely, when the entry of the local node apparatus is included in the free node list 130, the participation processing unit 106 verifies whether the identifier of the local node apparatus is included in the cluster information 128. When the determination in step S140 results in "YES" (Y), namely, when the identifier of the local node apparatus is included in the cluster information 128, the flow proceeds to step S142.

In step S142, the participation processing unit 106 deletes the entry of the local node apparatus from the free node list 130, and stores information of nodes included in the cluster information (CI) field in the cluster information 128. Then, the flow proceeds to step S144.

The participation processing unit 106 changes the setting of the local node apparatus to a participation node in step S144. After the process of step S138 is terminated, the process of the participation processing unit 106 is ended.

When the determination of step S140 results in "NO" (N), namely, when the identifier of the local node apparatus is not included in the cluster information 128, the flow proceeds to step S146.

In step S146, the participation processing unit 106 determines whether the end flag is "true". When this determination results in "YES" (Y), the flow proceeds to step S148. When this determination results in "NO" (NO), the process of the participation processing unit 106 is ended.

In step S148, since the number of node apparatuses of the cluster to which the local node apparatus 10 belongs reaches an upper limit, the entry of the free node list 130 is deleted, and the process of the participation processing unit is ended.

Figure 16:
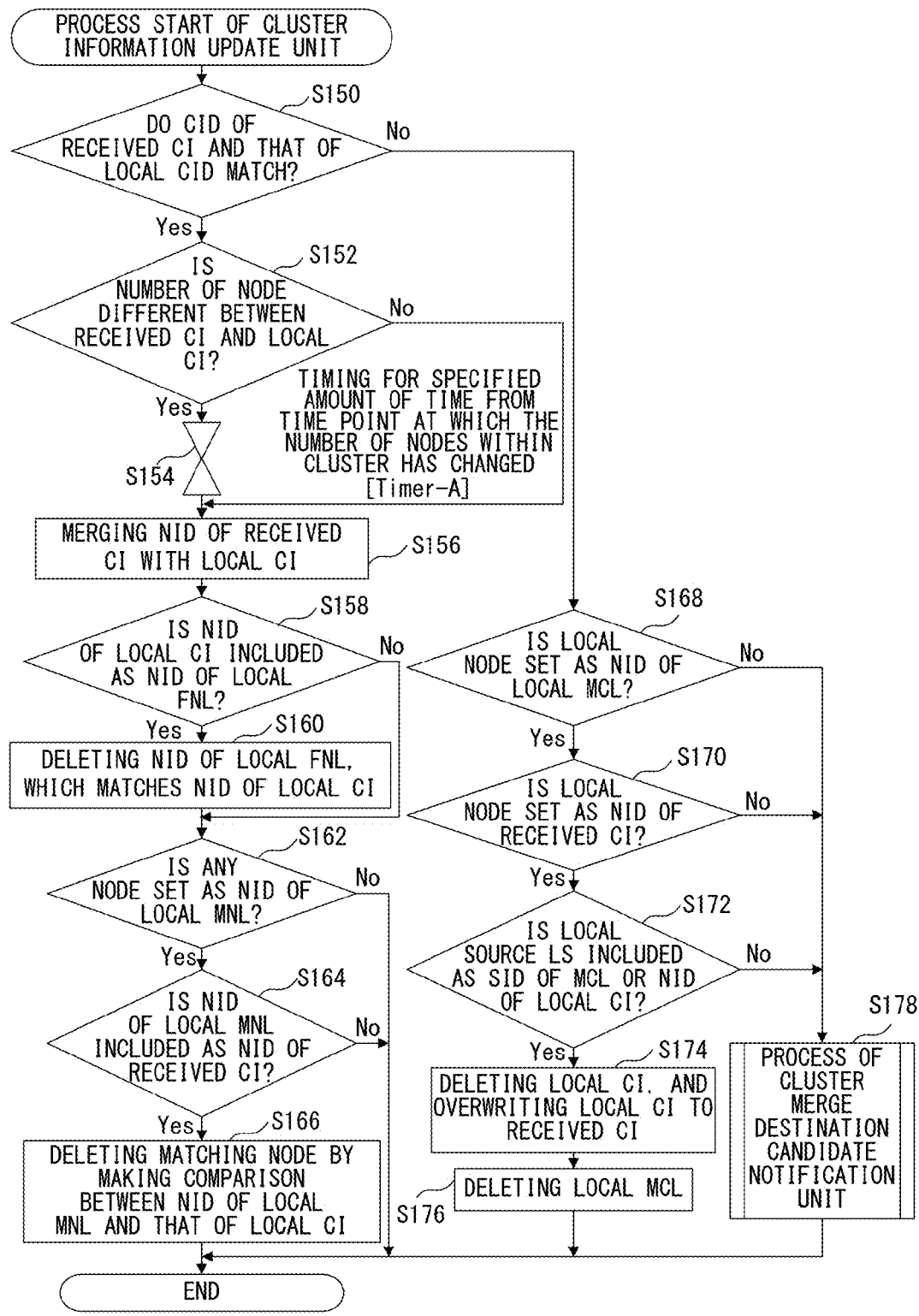
FIG. 16 is a flowchart illustrating an example of a flow of a process executed in a cluster information update processing unit.

FIG. 16 is a flowchart illustrating an example of operations of the cluster information update unit 108.

Each node executes the following process when a cluster identifier (CID) of cluster information (CI) of a received Hello packet is the same as cluster information (CID) stored in cluster information 128 of the local node apparatus. Namely, a timer for taking a timing for a specified amount of time is set at a time point when the number of node apparatuses within the cluster changes. When the number of node apparatuses within the cluster does not change, each node apparatus recognizes all nodes within the cluster to which the local node apparatus belongs by merging the cluster information (CI) of the received Hello packet with the cluster information 128 of the local node apparatus. Moreover, each node apparatus deletes the entries corresponding to the node apparatuses added to the cluster information 128 in the free node list 130 of the local node apparatus. When the identifiers (NIDs) of the node apparatuses, which are stored in the merge node list 134 of the local node apparatus, are included in the cluster information (CI) of the received Hello packet, each node apparatus recognizes that the cluster merging (on the master side) is complete, and deletes the entries stored in the merge node list 134 of the local node apparatus.

Each node executes the following process when the cluster identifier (CID) of the cluster information (CI) of the received Hello packet is different from the cluster identifier (CID) stored in the cluster information 128 of the local node apparatus. Namely, each node verifies the merge cluster list 132 of the local node apparatus, and the identifiers (NIDs) of the node apparatuses included in the cluster information (CI) of the received Hello packet. When the identifier of the local node apparatus is included, each node recognizes that the cluster merging (on the slave side) is complete, replaces the cluster information (CI) of the received Hello packet with the cluster information 128 of the local node apparatus, and deletes the entry stored in the merge node list 134 of the local node apparatus. When the cluster merging is not being performed, the cluster information update unit 108 passes, to the cluster merge destination candidate notification unit 114, the cluster information (CI) included in the Hello packet received from the node type determination unit 104.

In step S150, the cluster information update unit 108 determines whether the cluster identifier (CID) of the cluster information (CI) field of the received Hello packet and the cluster identifier (CID) stored in the cluster information 128 of the local node match. When this determination results in "YES", namely, when the identifiers match, the flow proceeds to step S152. Alternatively, when this determination results in "NO", namely, when the identifiers mismatch, the flow proceeds to step S168.

In step S152, when the cluster identifier (CID) of the cluster information (CI) field of the received Hello packet and the cluster identifier (CID) stored in the cluster information 128 of the local node match, the cluster information update unit 108 determines whether the number of nodes in the cluster identified with the cluster identifier (CID) included in the Hello packet is different from that of nodes in the cluster identified with the cluster identifier (CID) stored in the cluster information 128 of the local node apparatus. When this determination results in "YES", the flow proceeds to step S154. When this determination results in "NO", the flow proceeds to step S156.

In step S154, the cluster information update unit 108 sets a timer for measuring a timeout for a specified amount of time from a time point at which the number of nodes in the cluster identified with the cluster identifier (CID) changes. Then, the flow proceeds to step S156.

In step S156, the cluster information update unit 108 merges the identifiers ({NID}) of the nodes included in the cluster information (CI) field of the received Hello packet and the identifiers ({NID}) of the nodes included in the cluster identified with the cluster identifier (CID) of the cluster stored in the cluster information 128 of the local node apparatus. As a result, all the node apparatuses included in the cluster identified with the cluster identifier (CID) are recognized.

In step S158 next to step S156, the cluster information update unit 108 determines whether an identifier (NID) of node apparatus included in the cluster identified with the cluster identifier (CID) stored in the cluster information 128 of the local node apparatus is included in the list of identifiers (NIDs) of node apparatuses desired to participate in the cluster identified with the cluster identifier (CID) included in the free node list 130 of the local node apparatus.

When the determination of step S158 results in "YES", the flow proceeds to step S160. Alternatively, when the determination results in "NO", the flow proceeds to step S162 without executing the process of step S160.

In step S160, the cluster information update unit 108 deletes the identifier (NID), which matches any of the identifiers ({NID}) of nodes included in the cluster recognized with the identifier of the cluster (CID) stored in the cluster information 128 of the local node apparatus, of node apparatus included in the free node list 130 of the local node apparatus. Then, the flow proceeds to step S162.

In step S162, the cluster information update unit 108 determines whether the merge node list 134 of the local node apparatus is set. When the merge node list 134 is set, the flow proceeds to step S164. When the merge node list 134 is not set, the process of the cluster information update unit 108 is ended.

In step S164, the cluster information update unit 108 determines whether identifiers ({NID}) of nodes, which are included in the merge node list 132 of the local node apparatus, are included as the identifiers ({NID}) of nodes, which are included in the cluster information (CI) field of the received Hello packet. When this determination results in "YES", the flow proceeds to step S166. When this determination results in "NO", the process of the cluster information update unit 108 is ended.

In step S166, the cluster information update unit makes a comparison between the identifiers ({NID}) of the nodes, which are included in the merge node list 132 of the local node apparatus, and the identifiers ({NID}) of the nodes included in the cluster identified with the cluster identifier (CID) of the cluster, which is stored in the cluster information 128 of the local node apparatus, and deletes identifiers of the node apparatuses, which match the identifiers of the nodes included in the cluster, from the merge node list 132 of the local node apparatus. Here, the process of the cluster information update unit 108 is ended.

When the cluster identifier (CID) of the cluster information (CI) field of the received Hello packet and the cluster identifier (CID) stored in the cluster information 128 of the local node do not match, the cluster information update unit 108 determines, instep S168, whether the identifier (NID) of the local node apparatus is set in the merge cluster list 132 of the local node apparatus. When this determination results in "YES", the flow proceeds to step S170. Alternatively, when this determination results in "NO", the flow proceeds to step S178.

Instep S170, the cluster information update unit 108 determines whether the identifier (NID) of the local node apparatus is included in the identifiers ({NID}) of the nodes, which are included in the cluster information (CI) field of the received Hello packet. When this determination results in "YES", the flow proceeds to step S172. When this determination results in "NO", the flow proceeds to step S178.

In step S172, the cluster information update unit 108 determines whether the local source LS of the received Hello packet is included in either SIDs of the merge cluster list or the identifiers (NIDs) of node apparatuses, which are included in the cluster information 128 of the local node apparatus. When this determination results in "YES", the flow proceeds to step S174. Alternatively, when this determination results in "NO", the flow proceeds to step S178.

Instep S174, the cluster information update unit 108 deletes the information included in the cluster information 128 of the local node, and overwrites the information included in the cluster information (CI) field of the received Hello packet to the cluster information 128 of the local node apparatus.

In step S176 next to step S174, the cluster information update unit 108 deletes the information included in the merge cluster list 132 of the local node apparatus. Here, the process of the cluster information update unit 108 is terminated.

In step S178, the process of the cluster merge destination candidate notification unit is executed.

After the process of step S178 is terminated, the process of the cluster information update unit 108 is ended.

FIG. 17 is a flowchart illustrating an example of operations of the cluster generation unit 110.

In step S180, the cluster generation unit 110 determines whether the value of the end flag in the cluster information 128 is "true". When the value of the end flag is "true", new node apparatus is not allowed to be added to the cluster. When this determination results in "NO", namely, when the value of the end flag is "false", the new node apparatus is enabled to be added to the cluster. When this determination results in "YES", namely, when the value of the end flag is "true", the process of the cluster generation unit 110 is terminated. When the value of the end flag is "false", the flow proceeds to step S182.

When the value of the end flag is "false", the cluster generation unit 110 verifies whether free node information included in the free node list (FNL) field of the received Hello packet is an identifier of the node apparatus that attempts to participate in the cluster created by the local node apparatus. Accordingly, in step S182, the cluster generation unit 110 determines whether the cluster identifier (CID) included in the free node list (FNL) field of the received Hello packet and the cluster identifier (CID) included in the cluster information 128 differ. When this determination results in "NO", namely, when the free node information and the cluster identifier (CID) included in the cluster information 128 match, the cluster generation unit 110 recognizes that a request to participate in the cluster has been issued to the cluster generated by the local node apparatus. Then, the flow proceeds to step S184. When this determination results in "YES", the process of the cluster generation unit 110 is ended.

In step S184, the cluster generation unit 110 adds the identifier (NID) of the node apparatus, which is included in the free node information, to the cluster information 128, and makes the node apparatus participate in the cluster. After the process of step S184 is terminated, the process of the cluster generation unit 110 is ended.

Figure 18:
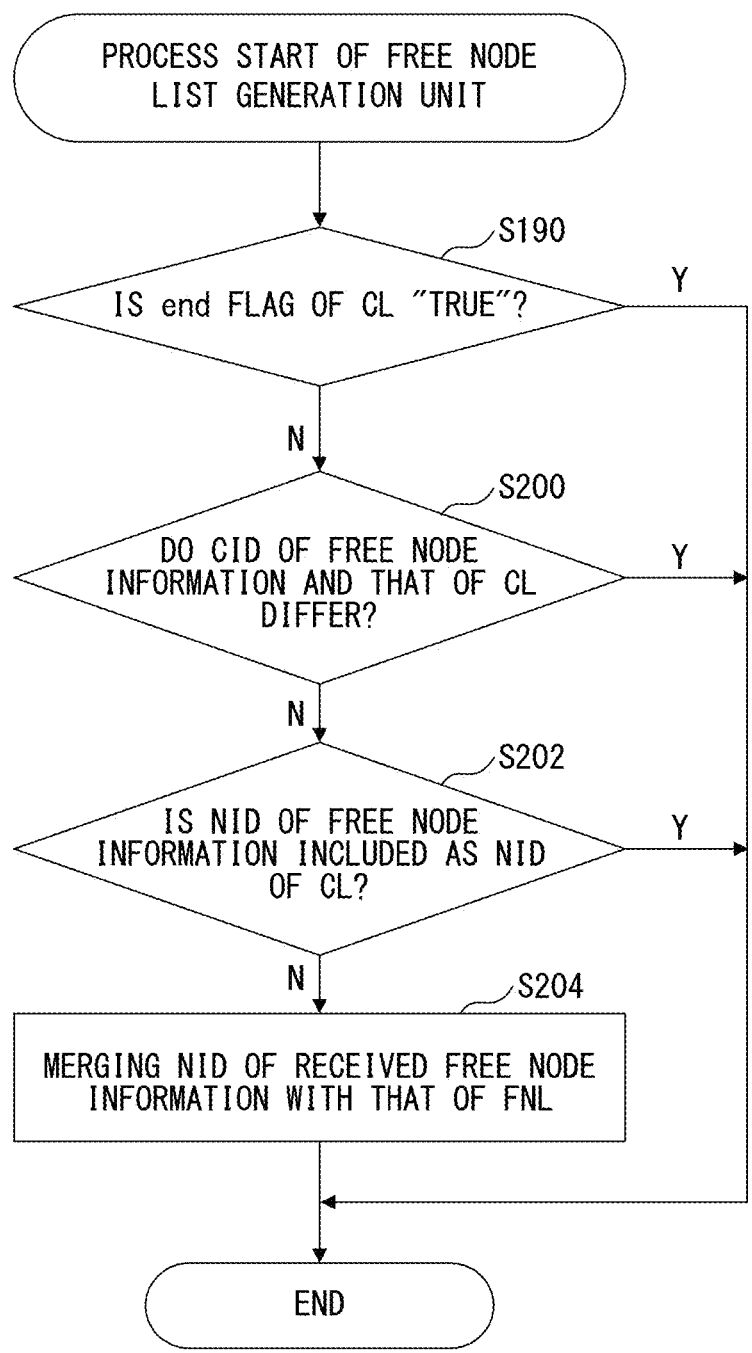
FIG. 18 is a flowchart illustrating an example of a flow of a process executed in a free node list generation unit.

FIG. 18 is a flowchart illustrating an example of operations of the free node list generation unit 112.

steps S190 and S200 are a process similar to that of steps S180 and S182.

In step S190, the free node list generation unit 112 determines whether the value of the end flag in the cluster information 128 is "true". When this determination results in "YES", namely, when the value of the end flag is "true", the process of the free node list generation unit 112 is terminated. When the value of the end flag is "false", the flow proceeds to step S200.

In step S200, the free node list generation unit 112 determines whether the cluster identifier (CID) included in the free node list (FNL) field of the received Hello packet and the cluster identifier (CID) included in the cluster information 128 differ. When this determination results in "NO", the free node list generation unit 112 recognizes that the request to participate in the cluster has been issued to the cluster generated by the local node apparatus. Then, the flow proceeds to step S202. When this determination results in "YES", the process of the free node list generation unit 112 is ended.

In step S202, the free node list generation unit 112 determines whether the identifier of the node apparatus (NID) included in the free node list (FNL) field of the received Hello packet is included in the cluster information 128. When this determination results in "NO", namely, when the identifier (NID) of the node apparatus, which is included in the free node list (FNL) field, is not included in the cluster information 128, the flow proceeds to step S204. Alternatively, when this determination results in "NO", namely, when the identifier (NID) of the node apparatus, which is included in the free node list (FNL) field, is not included in the cluster information 128, the flow proceeds to step S204. When this determination results in "YES", the process of the free node list generation unit 112 is ended.

In step S204, the free node list generation unit 112 adds the identifier (NID) of the node apparatus, which is included in the free node list (FNL) field, to the free node list 130. After the process of step S204 is terminated, the process of the free node list generation unit 112 is ended.

Figure 19:
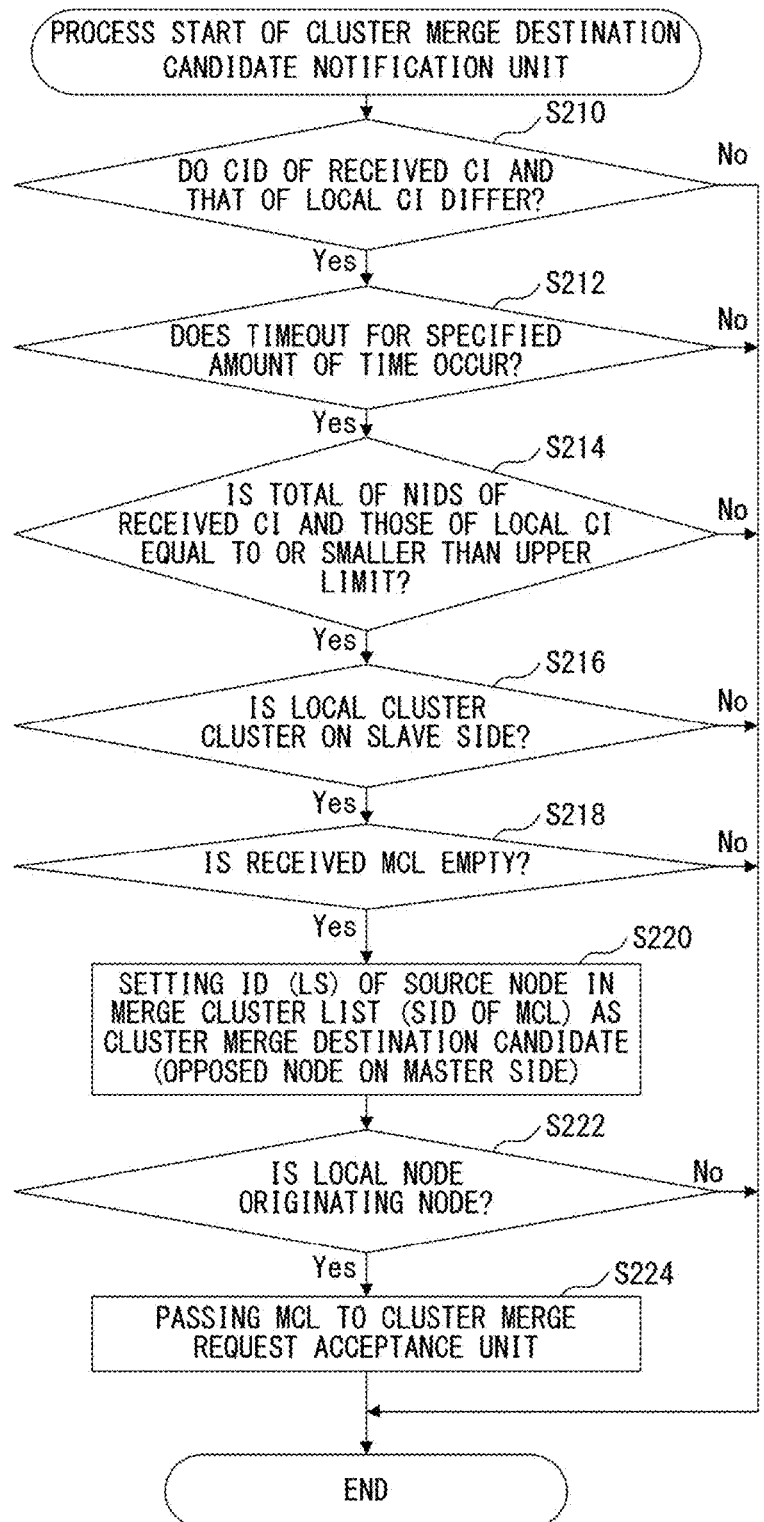
FIG. 19 is a flowchart illustrating an example of a flow of a process executed in a cluster merge destination candidate notification unit.

FIG. 19 is a flowchart illustrating an example of operations of the cluster merge destination candidate notification unit 114.

Upon receipt of a Hello packet including cluster information (CI) different from a cluster identifier (CID) of a cluster to which a local node belongs, each node determines whether the cluster forming makes a transition to the cluster merging stage by judging whether a timer starting at a time point when the number of node apparatuses of the cluster no more changes times out. When the cluster forming makes the transition to the cluster merging stage, the node totals the number of nodes in the cluster information 128 of the local node apparatus and that of nodes of the cluster in the cluster information (CI) of the received Hello packet. When the totaled number does not exceed an upper limit, the node determines that the clusters are allowed to be merged. When the clusters are allowed to be merged and the cluster to which the local node apparatus belongs is a cluster on the slave side, the node sets a cluster merge destination candidate (the node apparatus belonging to the cluster on the master side) as an SID of the merge cluster list (MCL). Moreover, when the local node is an originating node, the node passes the set merge cluster list to the cluster merge acceptance unit.

In step S210, the cluster merge destination candidate notification unit 114 determines whether the cluster identifier (CID) of the cluster information (CI) field in the received Hello packet and the cluster identifier (CID) stored in the cluster information 128 of the local node apparatus differ. The Hello packet at this time has a meaning as a cluster merge destination candidate notification. When this determination results in "YES", namely, when the cluster identifier (CID) of the cluster information (CI) field of the received Hello packet and the cluster identifier (CID) stored in the cluster information 128 of the local node apparatus differ, the flow proceeds to step S212.

In step S212, the cluster merge destination candidate notification unit 114 determines whether a timeout for a certain amount of time, which starts at a time point when the number of node apparatuses no more changes, has occurred. When this determination results in "YES", the cluster merge destination candidate notification unit 114 recognizes that the cluster forming has made a transition to the cluster merging stage. Then, the flow proceeds to step S214.

In step S214, the cluster merge destination candidate notification unit 114 determines whether a total of the number of entries of identifiers (NIDs) of node apparatuses included in the cluster information (CI) field in the received Hello packet and the number of entries of identifiers of node apparatuses stored in the cluster information 128 of the local node apparatus is equal to or smaller than the maximum number of cluster nodes, which is the upper limit of the number of node apparatuses per cluster. When this determination results in "YES", the cluster to which the node apparatus at the source of the Hello packet belongs, and the cluster to which the local node apparatus belongs are allowed to be merged. Then, the flow proceeds to step S216.

In step S216, the cluster merge destination candidate notification unit 114 determines whether the cluster to which the local node belongs is a cluster on the slave side. When this determination results in "YES", the flow proceeds to step S216.

In step S218, the cluster merge destination candidate notification unit 114 determines whether the merge cluster list (MCL) of the received Hello packet is empty. If this determination results in "YES", the flow proceeds to step S220.

In step S220, the cluster merge destination candidate notification unit 114 sets, as an SID of the merge cluster list (MCL), the cluster merge destination candidate, namely, the node apparatus that belongs to the cluster on the master side and is adjacent to the local node.

In step S222 next to step S220, the cluster merge destination candidate notification unit 114 determines whether the local node is an originating node. When this determination results in "YES", the flow proceeds to step S224.

In step S224, the cluster merge destination candidate notification unit 114 passes the set merge cluster list to the cluster merge request acceptance unit 116. Then, the process of the cluster merge destination candidate notification unit 114 is ended.

Alternatively, when the determinations of steps S210, S212, S214, S216, S218, and S222 result in "NO", the process of the cluster merge destination candidate notification unit 114 is ended.

Figure 20:
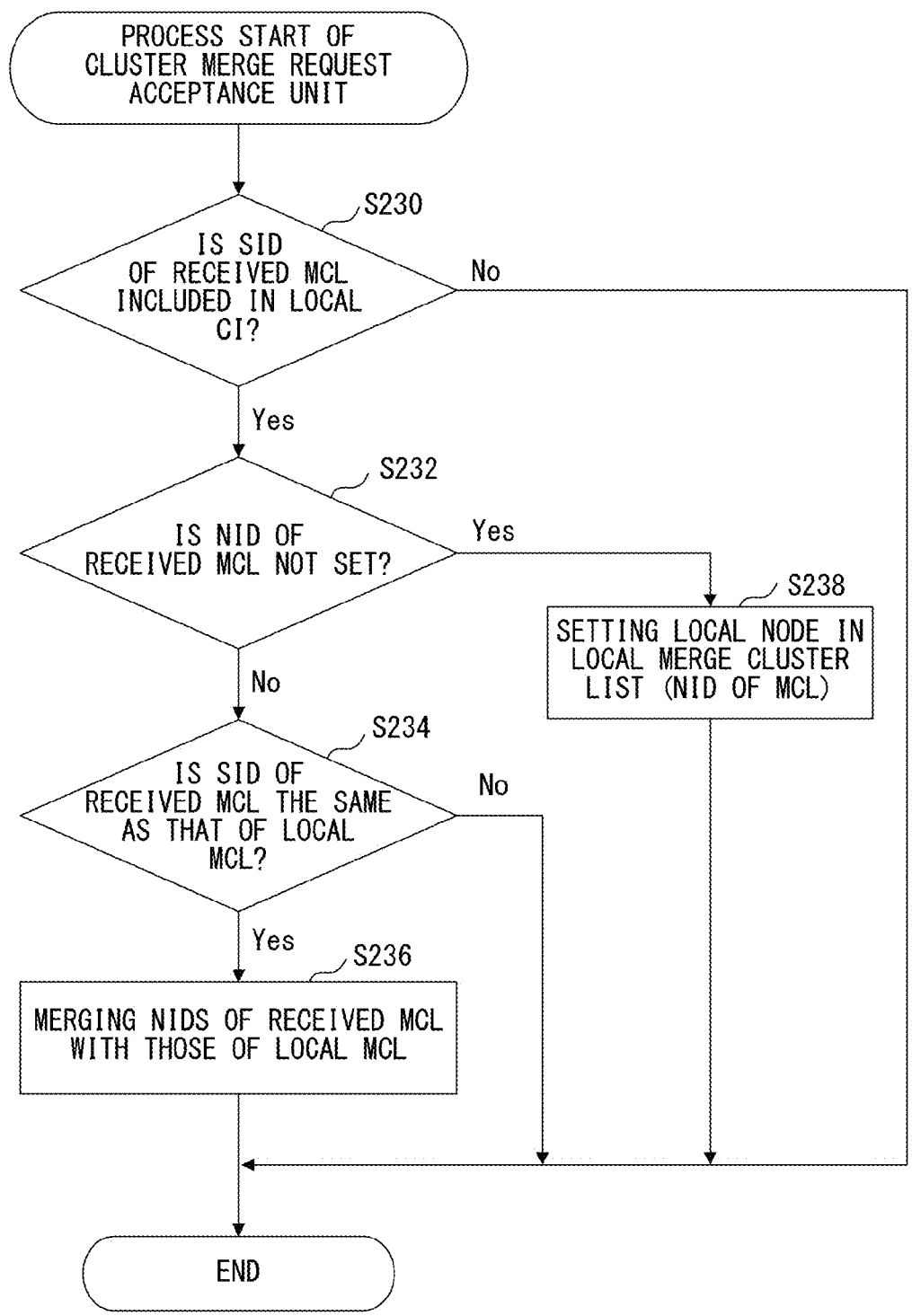
FIG. 20 is a flowchart illustrating an example of a flow of a process executed in a cluster merge request acceptance unit.

FIG. 20 is a flowchart illustrating an example of operations of the cluster merge request acceptance unit 116.

In the process illustrated in FIG. 20, an originating node determines whether a conflict of cluster merge destination candidate notifications from different clusters occurs based on information included in the merge cluster list 132 of the local node apparatus by making a comparison between the notifications, and accepts the cluster merge destination candidate notification when the conflict does not occur.

Upon acceptance of the cluster merge destination candidate notification, the originating node adds the identifier (NID) of the local node apparatus to the merge cluster list 132.

In step S230, the cluster merge request acceptance unit 116 determines whether the identifier SID of the node apparatus in the cluster on the master side, which is included in the merge cluster list (MCL) field of the received Hello packet, is included in the cluster information 128 of the local node. When this determination results in "YES", the flow proceeds to step S232. Alternatively, when this determination results in "NO", the process of the cluster merge request acceptance unit 116 is ended.

In step S232, the cluster merge request acceptance unit 116 determines whether the identifier (NID) of the node apparatus in the merge cluster list (MCL) field of the received Hello packet is not set. When this determination results in "YES", the flow proceeds to step S238. Alternatively, when this determination results in "NO", the flow proceeds to step S234.

In step S234, the cluster merge request acceptance unit 116 determines whether the identifier of the node apparatus (SID) in the cluster on the master side, which is included in the merge cluster list (MCL) field of the received Hello packet, is the same as the identifier of the node apparatus (SID) in the cluster on the master side, which is included in the merge cluster list 132 of the local node apparatus. When this determination results in "YES", the flow proceeds to step S236. When this determination results in "NO", the process of the cluster merge request acceptance unit 116 is ended.

In step S236, the cluster merge request acceptance unit 116 merges the identifier (NID) of the node apparatus, which is included in the merge cluster list (MCL) field of the received Hello packet, with the identifier (NID) of the node apparatus, which is included in the merge cluster list 132 of the local node apparatus.

When the determination of step S232 results in "YES", namely, when the cluster merge request acceptance unit 116 determines that the identifier (NID) of the node apparatus in the merge cluster list (MCL) field of the received Hello packet is not set, the cluster merge request acceptance unit 116 executes the process of step S238.

In step S238, the cluster merge request acceptance unit 116 sets the identifier (NID) of the local node apparatus as the identifier (NID) of the node apparatus, which is included in the merge cluster list 132 of the local node apparatus. Here, the process of the cluster merge request acceptance unit 116 is ended.

Figure 21:
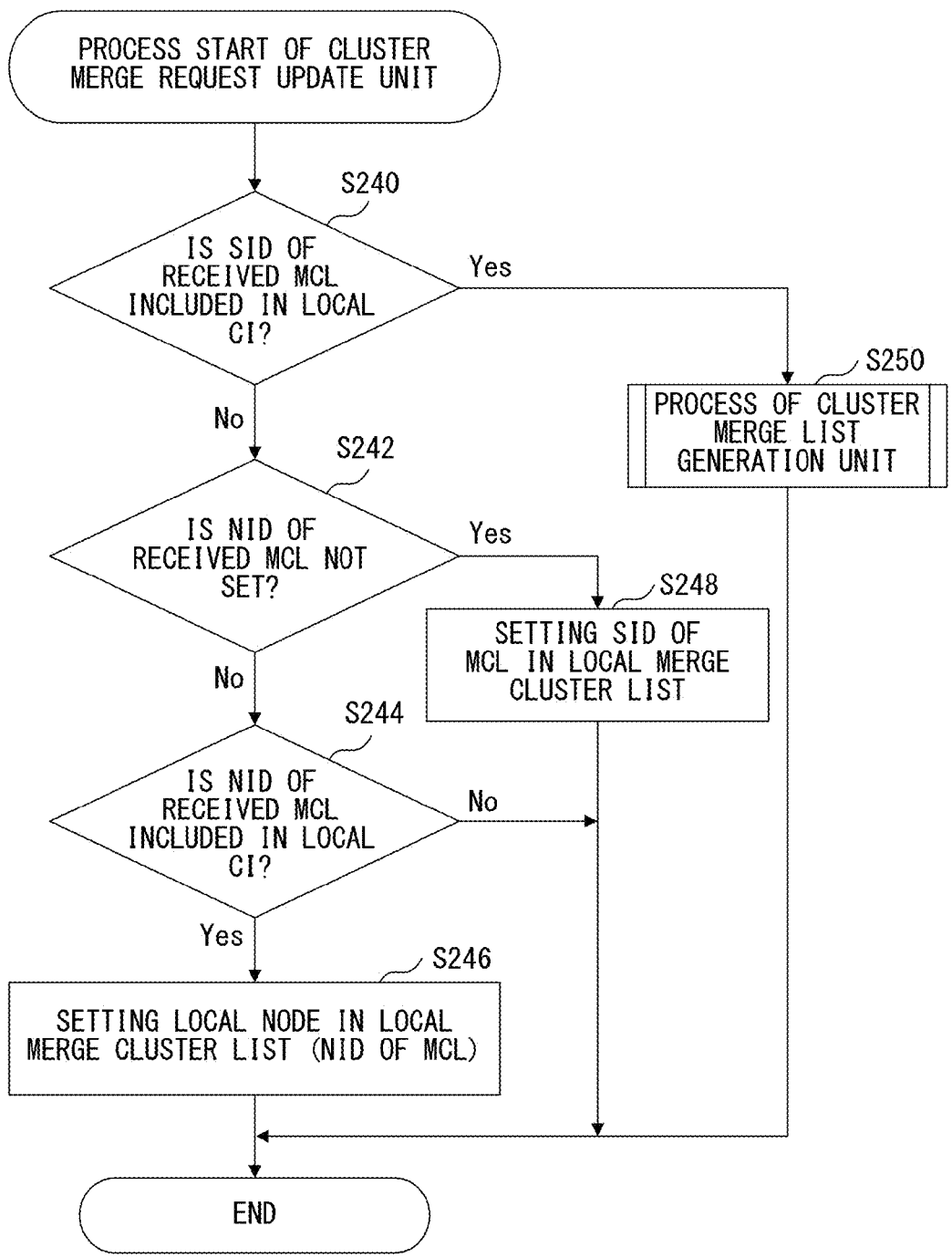
FIG. 21 is a flowchart illustrating an example of a flow of a process executed in a cluster merge request update unit.

FIG. 21 is a flowchart illustrating an example of operations of the cluster merge request update unit 118.

In the process illustrated in FIG. 21, a participation node determines that a cluster merge request notification has been accepted upon recognizing that an originating node of a cluster to which the local node apparatus belongs is set in a merge cluster list (MCL), and adds the identifier of the local node apparatus to the merge cluster list 132 of the local node apparatus.

In step S240, the cluster merge request update unit 118 determines whether the identifier of the node apparatus (SID) in the cluster on the master side, which is included in the merge cluster list (MCL) field of the received Hello packet, is included in the cluster information 128 of the local node. When this determination results in "YES", the flow proceeds to step S250, in which the process of the cluster merge list generation unit 120 is executed. Here, the process of the cluster merge request update unit 118 is ended. When this determination results in "NO", the flow proceeds to step S242.

In step S242, the cluster merge request update unit 118 determines whether the identifier (NID) of the node apparatus in the merge cluster list (MCL) field of the received Hello packet is not set. When this determination results in "NO", the flow proceeds to step S244. When this determination results in "NO", the flow proceeds to step S248.

In step S248, the cluster merge request update unit 118 sets, in the merge cluster list 132 of the local node, the identifier (SID) of the node apparatus, which is included in the merge cluster list (MCL) field of the received Hello packet, in the cluster on the master side. Here, the process of the cluster merge request update unit 118 is ended.

In step S244, the cluster merge request update unit 118 determines whether the identifier (NID) of the node apparatus in the merge cluster list (MCL) field of the received Hello packet is included in the cluster information 126 of the local node. When this determination results in "NO", the process of the cluster merge request update unit 118 is ended. When this determination results in "YES", the flow proceeds to step S246.

In step S246, the cluster merge request update unit 118 adds the identifier of the local node apparatus as the identifier (NID) of node apparatus, which is stored in the merge cluster list 132 of the local node apparatus. Here, the process of the cluster merge request update unit 118 is ended.

Figure 22:
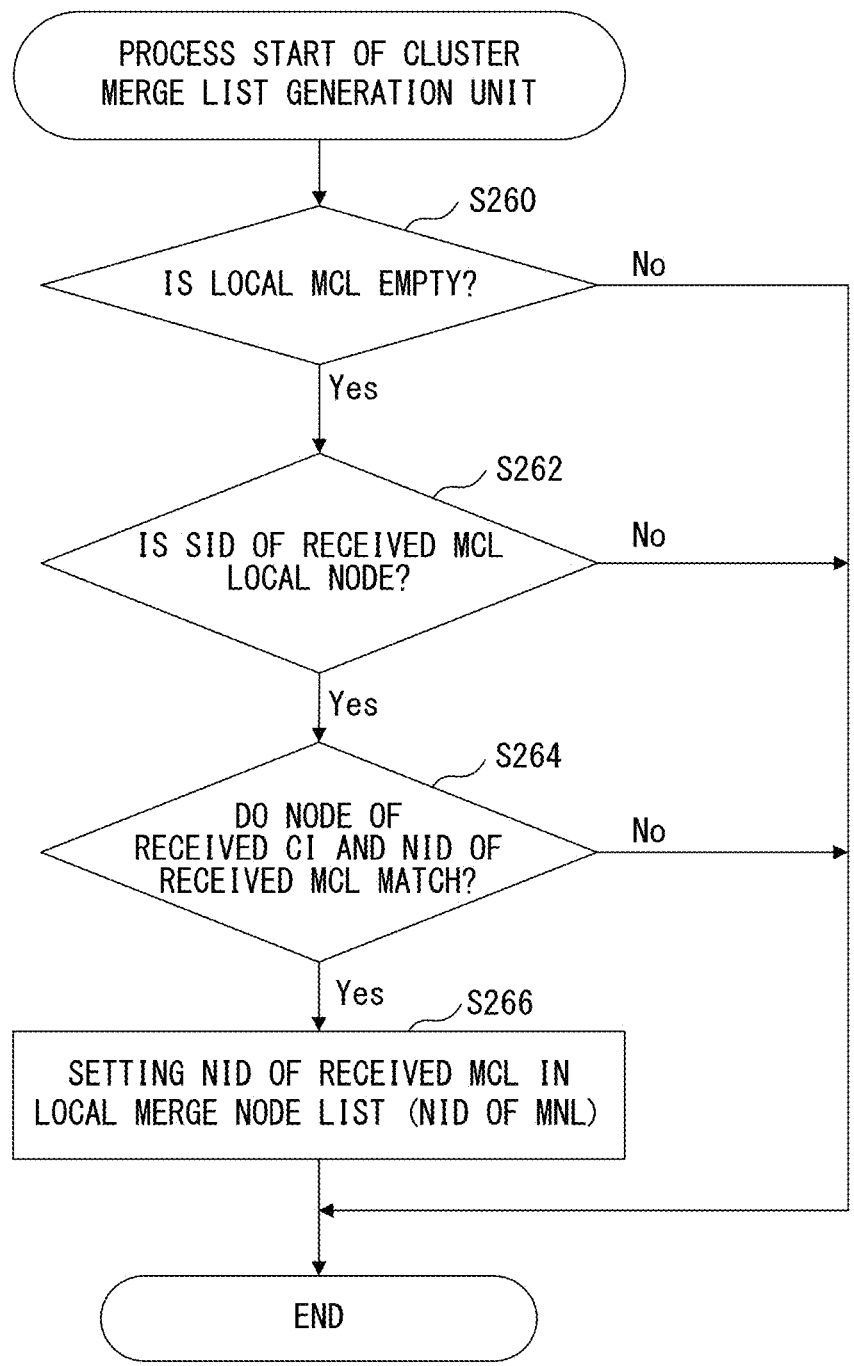
FIG. 22 is a flowchart illustrating an example of a flow of a process executed in a cluster merge list generation unit.

FIG. 22 is a flowchart illustrating an example of operations of the cluster merge list generation unit 120.

An opposed node on the master side verifies whether an identifier (NID) of node apparatus, which is stored in the cluster information 128 of the local node apparatus, and an identifier (NID) of node apparatus, which is included in the merge cluster list (MCL) field of the received cluster merge request notification, perfectly match. When the identifiers match, the opposed node sets the identifier (NID) of the node apparatus, which is included in the merge cluster (MCL) field of the received Hello packet (cluster merge request notification), as the identifier (NID) of the node apparatus stored in the cluster information 128 of the local node apparatus.

In step S260, the cluster merge list generation unit 120 determines whether the merge cluster list 132 of the local node apparatus is empty. When this determination results in "YES", the flow proceeds to step S262.

In step S262, the cluster merge list generation unit 120 determines whether the identifier of the node apparatus (SID), which is included in the merge cluster list (MCL) field of the received Hello packet, in the cluster on the master side is the identifier of the local node apparatus. When this determination results in "YES", the flow proceeds to step S264.

In step S264, the cluster merge list generation unit 120 determines whether the identifier (NID) of the node apparatus, which is included in the cluster information (CI) field of the received Hello packet, and the identifier (NID) of the node apparatus, which is stored in the cluster information 128 of the local node apparatus, match. When this determination results in "YES", the flow proceeds to step S266.

In step S266, the cluster merge list generation unit 120 sets the identifier (NID) of the node apparatus, which is included in the cluster information (CI) field of the received Hello packet, in the merge node list 134 of the local node apparatus. Here, the process of the cluster merge list generation unit 120 is ended.

Additionally, when the determinations of steps S260, S262 and S264 result in "NO", the process of the cluster merge list generation unit 120 is ended.

FIG. 23 is a flowchart illustrating an example of operations of the cluster merge processing unit 122.

An originating node verifies a conflict of cluster merge requests, and performs cluster merging by adding NIDs of node apparatuses included in the merge node list (MNL) of the received Hello packet to the cluster information 128 of the node apparatus when a total of the number of identifiers (NIDs) of node apparatuses, which are included in the merge node list (MNL) of the received Hello packet, and the number of node apparatuses, which is stored in the cluster information 128 of the local node apparatus, is equal to or smaller than the maximum number of cluster nodes, which is an upper limit of the number of node apparatuses per cluster.

In step S270, the cluster merge processing unit 122 determines whether the merge cluster list 132 of the local node apparatus is not set. When this determination results in "YES", the flow proceeds to step S272.

In step S272, the cluster merge processing unit 122 determines whether a total of the number of identifiers (NIDs) of node apparatuses, which is included in the merge cluster list (MCL) field of the received Hello packet, and the number of identifiers (NIDs) of node apparatuses, which is stored in the cluster information 128 of the local node apparatus, is equal to or smaller than the maximum number of cluster nodes, which is the upper limit of node apparatuses per cluster. When this determination results in "YES", the flow proceeds to step S274.

In step S274, the cluster merge processing unit 122 merges the clusters by adding the identifiers of the node apparatuses (NIDs), which are included in the merge cluster list (MCL) field of the received Hello packet, to the cluster information 128 of the local node apparatus. Here, the process of the cluster merge processing unit 122 is ended.

Additionally, when the determinations of steps S270 and S272 result in "NO", the process of the cluster merge processing unit 122 is ended.

Figure 24:
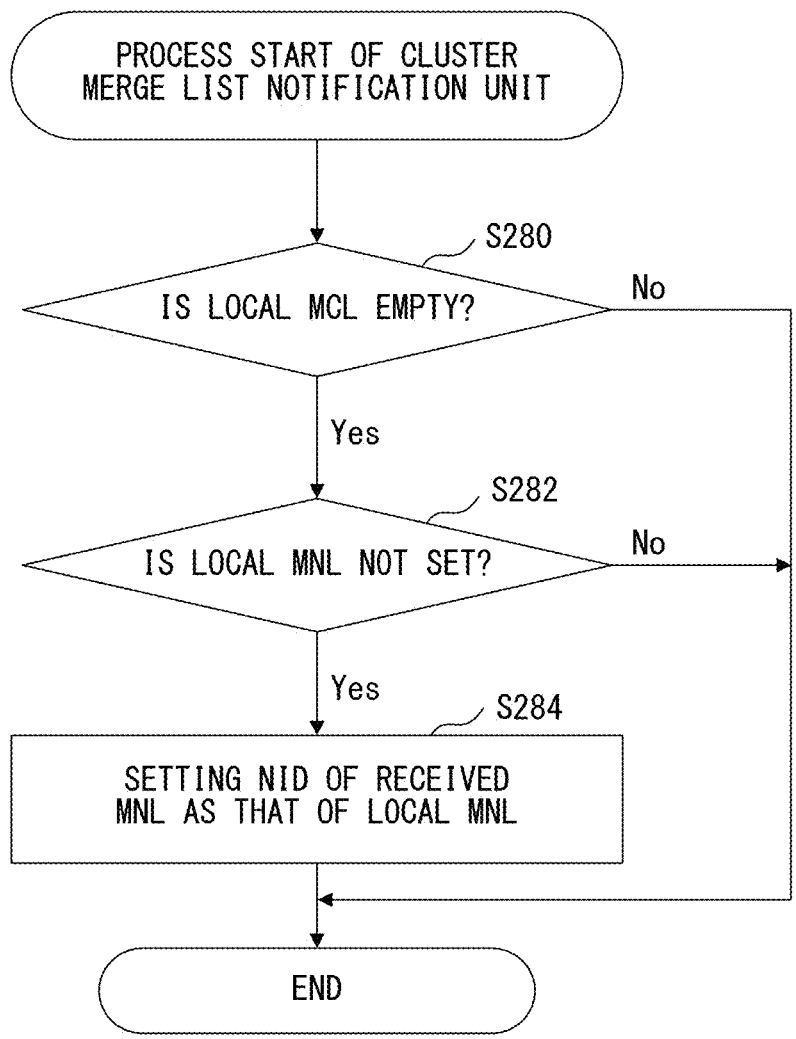
FIG. 24 is a flowchart illustrating an example of a flow of a process executed in a cluster merge list notification unit.
Figure 25:
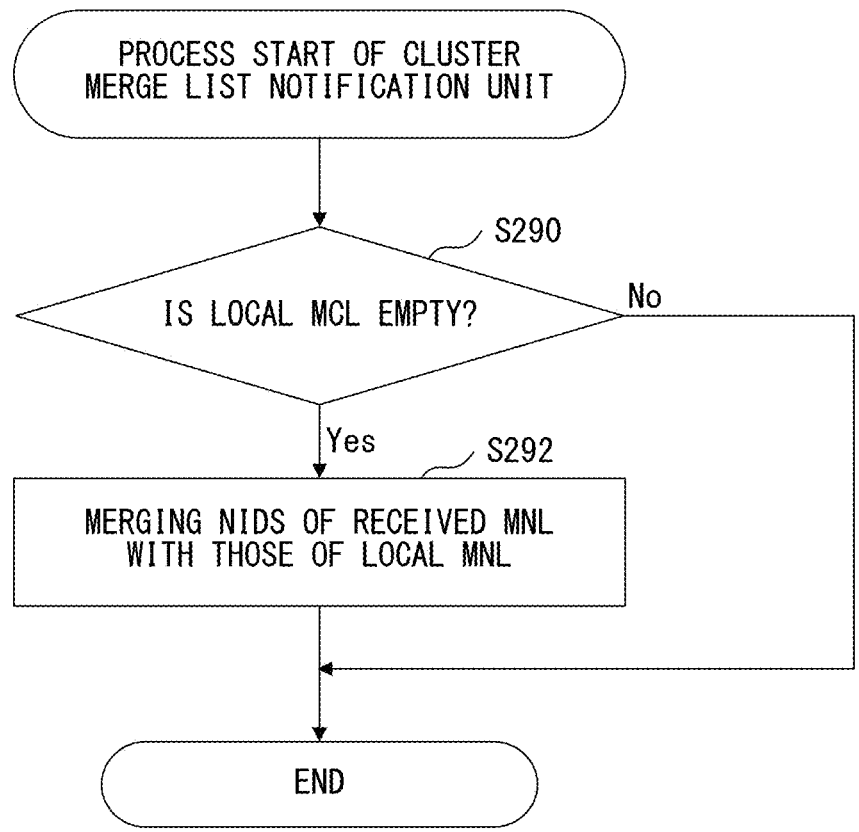
FIG. 25 is a flowchart illustrating another example of the flow of the process executed in the cluster merge list notification unit.

FIGS. 24 and 25 are flowcharts illustrating an example of operations of the cluster merge list notification unit 124.

A participation node verifies a conflict of cluster merge requests, and sets an identifier (NID) of node apparatus, which is included in a merge node list (MNL) field of a received Hello packet, as the identifier (NID) of the node apparatus included in the merge node list 134.

FIG. 24 is a flowchart illustrating an example of operations of the cluster merge list notification unit 124 when one of a plurality of clusters is merged when merge request notifications are transmitted from the plurality of clusters.

In step S280, the cluster merge list notification unit 124 determines whether the merge cluster list 132 of the local node apparatus is empty. When this determination results in "YES", the flow proceeds to step S282.

In step S282, the cluster merge list notification unit 124 determines whether the merge node list 134 of the local node apparatus is not set. When this determination results in "YES", the flow proceeds to step S284.

In step S284, the cluster merge list notification unit 124 sets the identifier (NID) of the node apparatus, which is included in the merge node list (MNL) field of the received Hello packet, as the identifier (NID) of the node apparatus, which is included in the merge node list 134. Here, the process of the cluster merge list notification unit 124 is ended.

Additionally, when the determinations of steps S280 and S282 result in "NO", the process of the cluster merge list notification unit 124 is ended.

FIG. 25 is a flowchart illustrating an example of operations of the cluster merge list notification unit 124, which are intended to merge one of a plurality of clusters when merge request notifications are transmitted from the plurality of clusters.

In step S290, the cluster merge list notification unit 124 executes a process similar to that of step S280. Namely, the cluster merge list notification unit 124 determines whether the merge cluster list 132 of the local node apparatus is empty. When this determination results in "YES", the flow proceeds to step S292. Alternatively, when this determination results in "NO", the process of the cluster merge list notification unit 124 is ended.

In step S292, the cluster merge list notification unit 124 executes a process similar to that of step S284. Namely, in step S292, the cluster merge list notification unit 124 sets the identifier (NID) of the node apparatus, which is included in the merge node list (MNL) field of the received Hello packet, as the identifier (NID) of the node apparatus, which is included in the merge node list 134. Here, the process of the cluster merge list notification unit 124 is ended.

<Process Sequence of the Cluster Merging>

An example of a process of the cluster merging is described with reference to FIGS. 26 to 28.

FIG. 26 illustrates an example of a topology of a network before clusters are merged. FIG. 26 illustrates a state where the cluster generation stage is complete based on the assumption that the maximum number of nodes per cluster is three in the cluster generation stage, which is the first stage of the cluster forming, and the maximum number of nodes per cluster is six in the cluster merging stage, which is the second stage.

Figure 27:
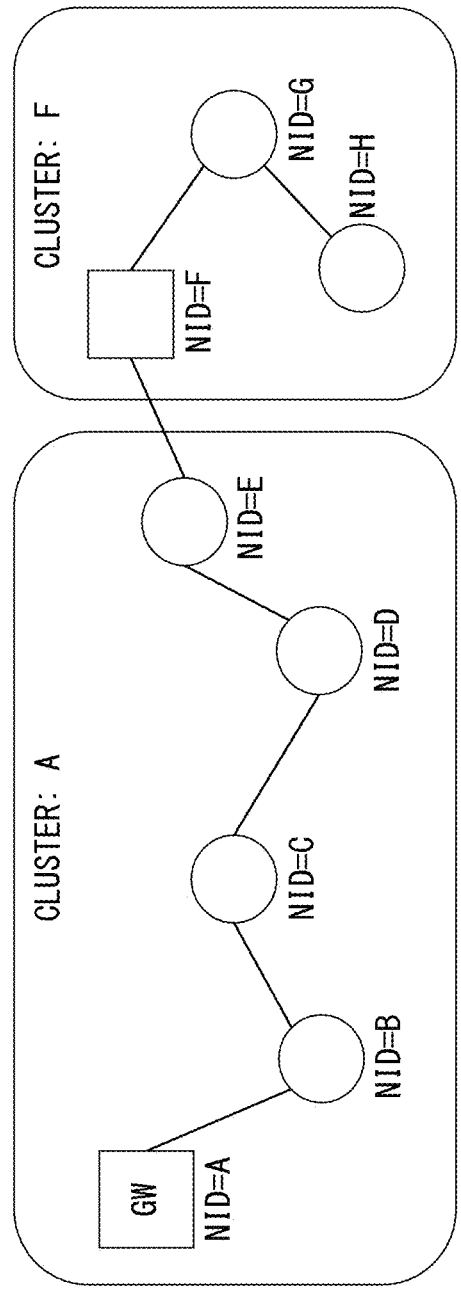
FIG. 27 illustrates an example of a topology of a network after clusters are merged.

The example of the process executed when the cluster A and the cluster E in FIG. 26 are merged and the cluster forming makes a transition to the state illustrated in FIG. 27 is described below.

In FIG. 26, the cluster A includes three node apparatuses each having an identifier NID=A, B, or C of the node apparatus, and an originating node is node apparatus having an identifier NID=A of the node apparatus. The cluster E includes two node apparatuses each having an identifier of the node apparatus NID=D or E, and an originating node is node apparatus having an identifier NID=E of the node apparatus.

In FIG. 27, the clusters A and E illustrated in FIG. 26 are merged, so that the cluster A, which includes the five node apparatuses each having an identifier NID=A, B, C, D or E of the node apparatus and in which an originating node is node apparatus having the identifier NID=A of the node apparatus, is formed.

Figure 28A:
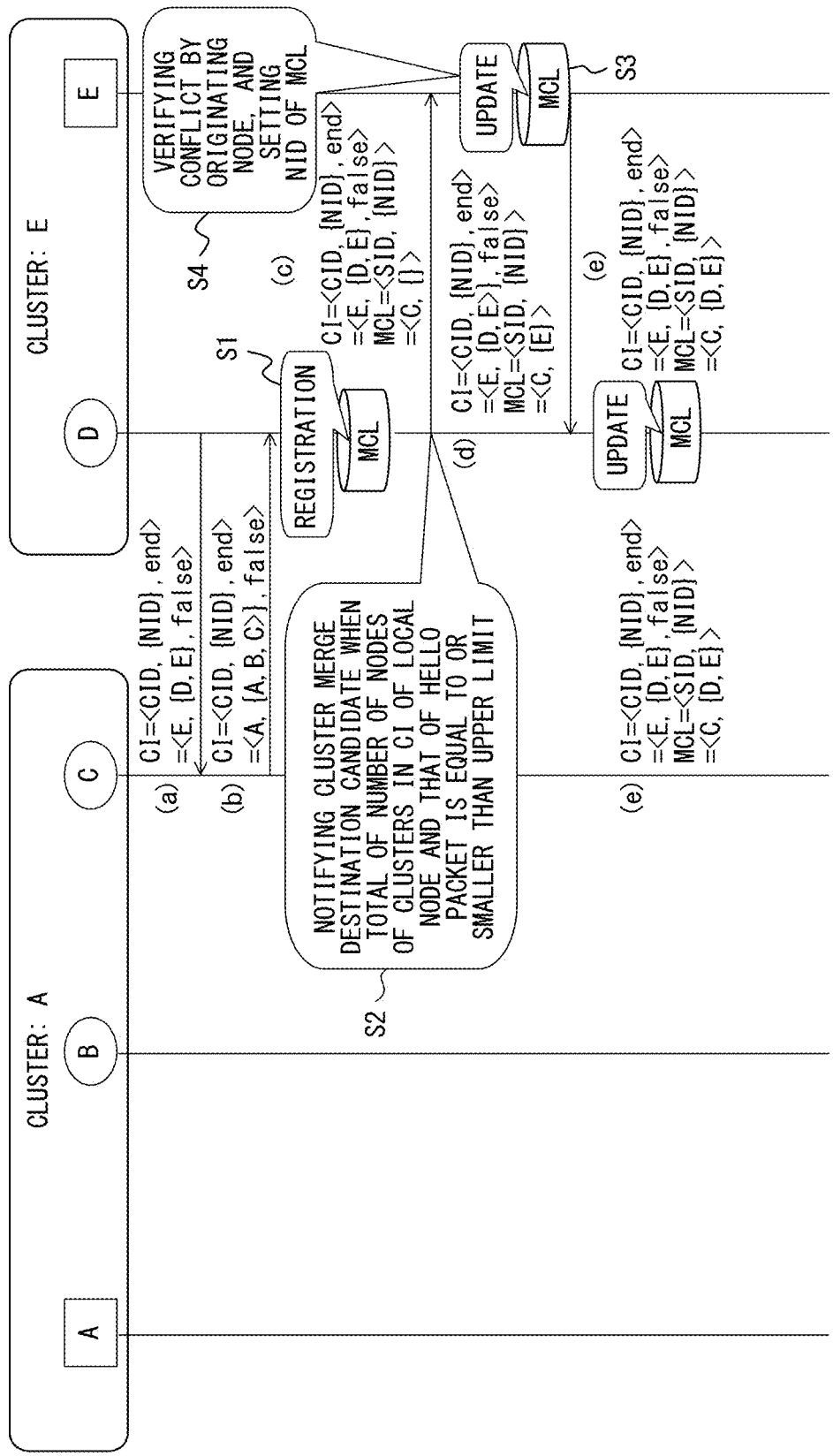
FIGS. 28A, 28B, and 28C illustrate an example of a process sequence of a cluster merging process.
Figure 28B:
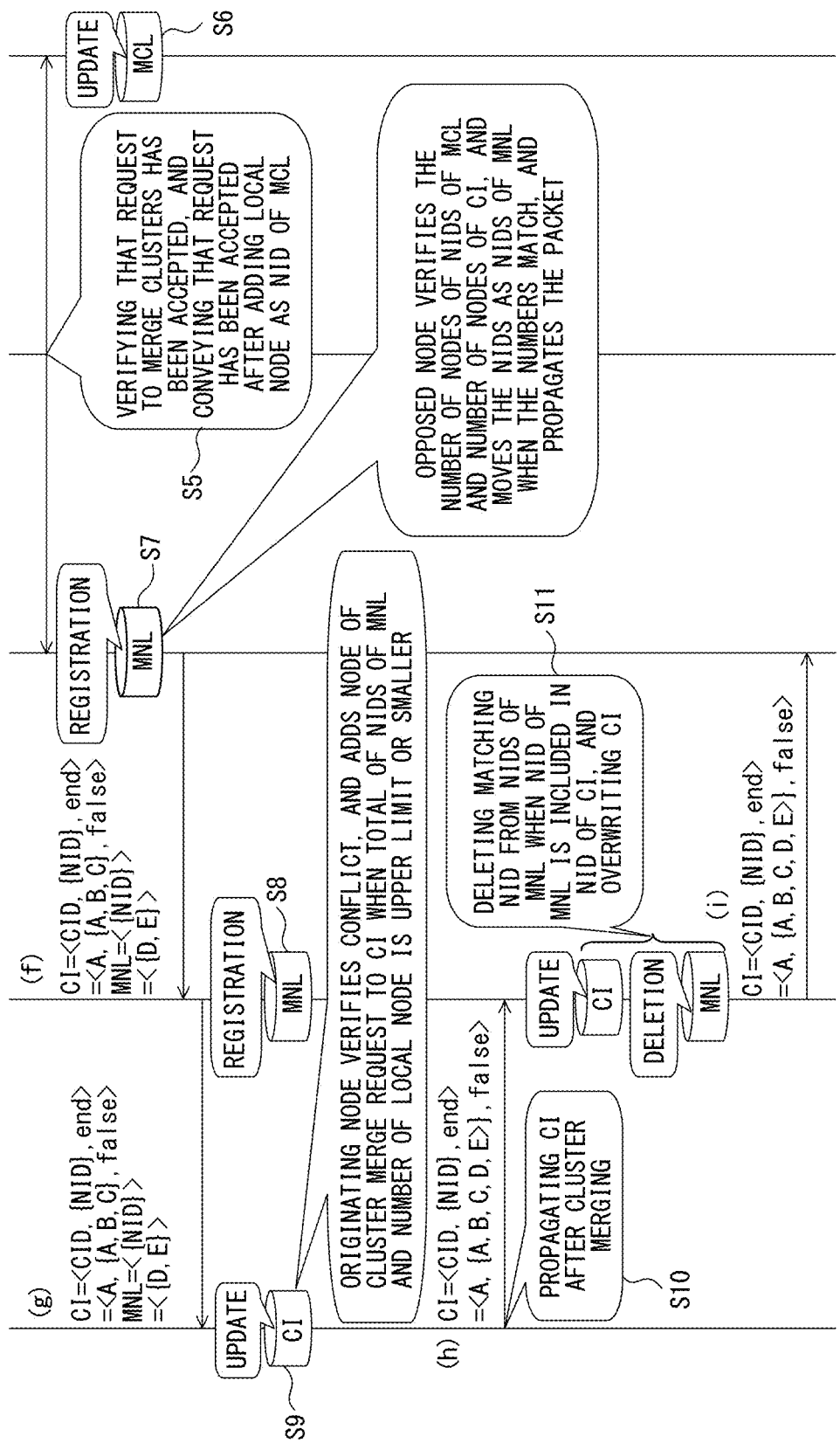
Figure 28C:
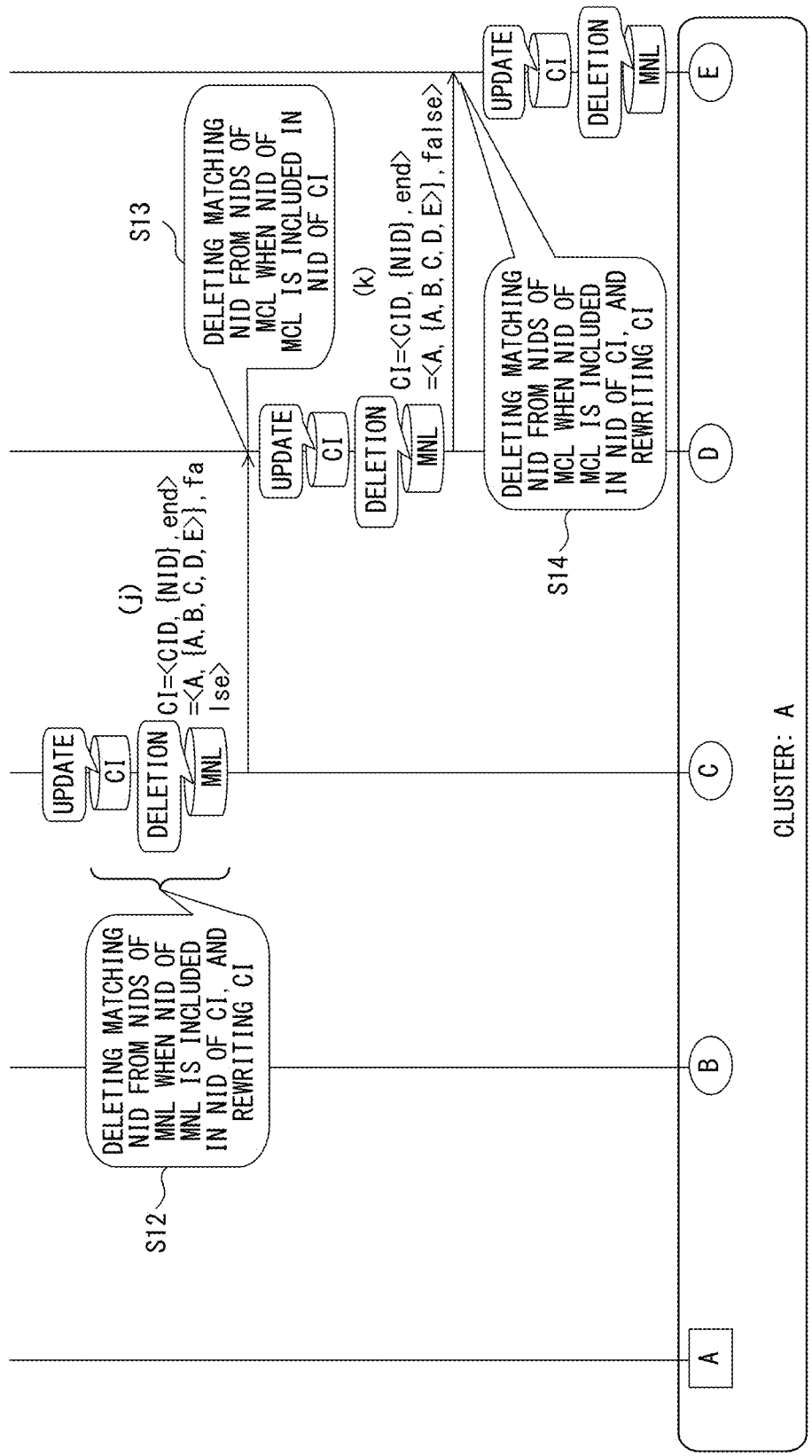

FIGS. 28A, 28B, and 28C are sequence diagrams for explaining an example of a process executed when the cluster forming makes a transition to the state illustrated in FIG. 27 after the clusters A and E are merged.

When the cluster E makes a transition to the cluster merging stage, the node apparatus D of the cluster E transmits a Hello packet (a) to the node apparatus C. In cluster information (CI) of the Hello packet (a), the following information is stored.

CI:<CID,{NID},end>=<A,{A,B,C},false>

The node apparatus C of the cluster A, which has received the Hello packet (a) from the node apparatus D of the cluster E, transmits a Hello packet (b) to the node apparatus D. In a cluster information (CI) field of the Hello packet (b), the following information is stored.

CI:<CID,{NID},end>=<A,{A,B,C},false>

The node apparatus D adds the number of node apparatuses included in the cluster E to which the node apparatus D belongs in the cluster information 128 of the node apparatus D and that of identifiers of the node apparatuses {A,B,C}, which are included in the cluster information (CI) field of the Hello packet (b), and verifies that the maximum number of nodes per cluster is equal to or smaller than six in the merging stage. Then, the node apparatus D makes a registration S1 of the source C of the Hello packet (b) received from the node apparatus C as an identifier (SID) of the merge cluster list 132 in the local node apparatus.

Next, the node apparatus D executes a notification process S2 for broadcasting a Hello packet (c) as a cluster merge destination candidate notification to the inside of the cluster E. At this time, the cluster information (CI) field and the merge cluster list (MCL) field of the Hello packet (c), the following information are stored.

下記は、

CI:<CID,{NID},end>=<E,{D,E},false>
MCL:<SID,{NID}>=<C,I>

Since the node apparatus E that has received the Hello packet (c) from the node apparatus D is an originating node, it verifies that a conflict of cluster merge requests does not occur. Moreover, the node apparatus E executes a setting process S4 for setting an identifier (NID) of node apparatus in the merge cluster list 132 of the node apparatus E. Here, the node apparatus D executes an update process S3 for updating the merge cluster list 132 of the node apparatus E so that the node apparatus E is included in the merge cluster list 132. Next, the node apparatus E broadcasts a Hello packet (d) to the inside of the cluster E. In a cluster information (CI) field and a merge cluster list (MCL) field of the Hello packet (d), the following information are stored.

CI:<CID,{NID},end>=<E,{D,E},false>
MCL:<SID, {NID}>=<C, {E}>

The node apparatus D that has received the Hello packet (d) from the node apparatus E recognizes that the cluster merge request has been accepted because the originating node E is included in the merge cluster list of the received Hello packet (d), updates the merge cluster list 132 of the local node apparatus so that the node apparatus D is included, and executes a process S5 for conveying that the cluster merge request has been accepted. The node apparatus D broadcasts a Hello packet (e). In a cluster information (CI)

field and a merge cluster list (MCL) field of the Hello packet (e), the following information are stored.
CI:<CID,{NID},end>=<E,{D,E},false>
MCL:<SID,{NID}>=<C,{D,E}>

The node apparatus C (the opposed node of the node apparatus D) that has received the Hello packet (e) from the node apparatus D verifies the number of identifiers ({NID={D,E}}) of the node apparatuses, which are stored in the merge cluster list (MCL) field of the Hello packet (e), and the number of identifiers of the node apparatuses {D,E}, which are included in the cluster information (CI) field, and executes a registration process S7 for moving the nodes to the merge node list 132 when the numbers match.

Next, the node apparatus C broadcasts a Hello packet (f) to the inside of the cluster A. In a cluster information (CI) field and a merge node list (MNL) field of the Hello packet (f), the following information are stored.
CI:<CID,{NID},end>=<A,{A,B,C},false>
MNL:<{NID}>=<{D,E}>

The node apparatus B that has received the Hello packet (f) from the node apparatus C executes a registration process S8 for moving the identifiers ({NID}={D,E}) of the node apparatuses, which are stored in the merge node list (MNL) field of the Hello packet (f), to the merge node list 134 of the node apparatus B.

The node apparatus B broadcasts a Hello packet (g) to the inside of the cluster A. In a cluster information (CI) field and a merge node list (MNL) field of the Hello packet (g), the following information are stored.
CI:<CID,{NID},end>=<A,{A,B,C},false>
MNL:<{NID}>=<{D,E}>

The originating node A that has received the Hello packet (g) verifies that a conflict of cluster merging requests does not occur. Then, the originating node A executes an update process S9 for adding the nodes (D,E) included in the merge node list (MNL) field of the Hello packet (g) to the cluster information 126 when a total of the number of identifiers of the node apparatuses {D,E}, which are included in the merge node list 134, and the number of node apparatuses of the cluster A to which the node apparatus A included in the cluster information 126 belongs is equal to or smaller than the maximum number of cluster nodes.

Then, the node apparatus A generates a Hello packet (h) by using the information included in the cluster information 126 after the clusters are merged, and executes a transmission process S10. In a cluster information (CI) field of the Hello packet (h), the following information is stored.
CI:<CID,{NID},end>=<A,{A,B,C,D,E},false>

The node apparatus B that has received the Hello packet (h) from the node apparatus A deletes an identifier (NID) of node apparatus from the merge node list 134 of the node apparatus B when the identifier that matches the merge node list (MNL) of the node apparatus B is present among the identifiers {A,B,C,D,E} of the node apparatuses included in the cluster information (CI) field of the Hello packet (h), and executes a process S11 for rewriting the cluster information 128.

After executing the process S11, the node apparatus B transmits a Hello packet (i). In a cluster information (CI) field of the Hello packet (i), the following information is stored.
CI:<CID,{NID},end>=<A,{A,B,C,D,E},false>

The node apparatus C that has received the Hello packet (i) from the node apparatus B executes a process S12 similar to the process S11. Namely, the node apparatus C deletes the identifier (NID) of node apparatus from the merge node list (MNL) of the node apparatus C when the identifier that matches the merge node list 134 of the node apparatus C is present among the identifiers of the node apparatuses {A,B,C,D,E} included in the cluster information (CI) field of the Hello packet (i), and executes a process for rewriting the cluster information 128.

After executing the process S12, the node apparatus C transmits a Hello packet (j). In a cluster information (CI) field of the Hello packet (j), the following information is stored.
CI:<CID,{NID},end>=<A,{A,B,C,D,E},false>

The node apparatus D that has received the Hello packet (j) from the node apparatus C is to be merged because the local node apparatus D is included in the local merge cluster list 132, the local node apparatus D is included in the identifiers {A,B,C,D,E} of the node apparatuses included in the cluster information (CI) field of the Hello packet (j), namely, information indicating that the node apparatus D is permitted to be merged is included, and the node apparatus C, which is the transmission source of the Hello packet (j), matches the SID of the local merge cluster list 132. Therefore, the node apparatus D deletes, from the local merge cluster list 132, a node apparatus having an NID in the local merge cluster list 132, which matches the node apparatus included in the cluster information (CI) field of the Hello packet (j), and executes a process (13) for rewriting the node apparatuses included in the cluster information (CI) field of the Hello packet (j) to the local cluster information 128. After this process, the node apparatus D belongs to the cluster A.

After executing the process S13, the node apparatus C transmits a Hello packet (k). In a cluster information (CI) field of the Hello packet (k), the following information is stored.
CI:<CID,{NID},end>=<A,{A,B,C,D,E},false>

The node apparatus E that has received the Hello packet (k) from the node apparatus D is to be merged because the local node apparatus E is included in the local merge cluster list 132, the local node apparatus E is included in the identifiers {A,B,C,D,E} of the node apparatuses included in the cluster information (CI) field of the Hello packet (k), namely, information indicating that the node apparatus E is permitted to be merged is included, and the node apparatus D, which is the transmission source of the Hello packet (k), is included in the cluster information 128 of the node apparatus E. Therefore, the node apparatus E deletes, from the local merge cluster list 132, a node apparatus having an NID in the local merge cluster list 132, which matches the node apparatus included in the cluster information (CI) field of the Hello packet (k), and executes a process (14) for rewriting the node apparatuses included in the cluster information (CI) field of the Hello packet (k) to the local cluster information 128. After this process, the node apparatus E belongs to the cluster A.

As described above, the clusters A and E illustrated in FIG. 26 are merged, so that the cluster A where the five node apparatuses each having an NID=A, B, C, D or E are included and the originating node is the node apparatus having the identifier NID=A is formed as illustrated in FIG. 27.

FIG. 29 illustrates results of forming clusters by using the node apparatuses disclosed in the above described comparison example. In the meantime, FIG. 30 illustrates results of forming clusters by using the node apparatuses disclosed in the above described embodiment. In the embodiment, it is proved that clusters of a small size, namely, the clusters where the number of node apparatuses is smaller are reduced.

The cluster forming is performed in two stages such as the cluster generation process and the cluster merging process only by transmitting and receiving a Hello packet, whereby a load imposed on a network is alleviated, and the cluster forming can be performed while reducing a load imposed on a cluster head. By executing the cluster merging process, the number of clusters decreases, and the number of clusters straddled at the time of routing can be reduced. Moreover, process resources are reduced, whereby a throughput of an adhoc network is enabled to be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node apparatus in a network including a plurality of network apparatuses, the node apparatus comprising:
    a cluster information memory configured to store apparatus identification information of node apparatus included in a first cluster, which is a group of node apparatuses route information of which is stored by the node apparatus, among the plurality of node apparatuses in the network; and
    a processor configured to perform a process including:
    receiving, from adjacent node apparatus, a hello packet used to notify route information about a route for conveying information in the network, and apparatus identification information of node apparatus included in a second cluster, which is a group of node apparatuses route information of which is stored by the node apparatus;
    verifying that the number of node apparatuses included in the first cluster is equal to or lower than a specified ratio to a maximum number of cluster nodes defined with a specified integer value, and that the number does not change for a specified amount of time;
    obtaining the number of node apparatuses included in the first cluster based on the apparatus identification information of the node apparatuses, which is stored in the cluster information memory, upon receipt of the hello packet from one of adjacent node apparatuses included in the second cluster different from the first cluster, and determining whether a sum of the number of node apparatuses included in the first cluster and the number of node apparatuses included in the second cluster is equal to or smaller than the maximum number of cluster nodes;
    updating the apparatus identification information stored in the cluster information memory by adding the apparatus identification information of the node apparatuses included in the second cluster to the apparatus identification information of the node apparatuses included in the first cluster based on a result of the determination, and to merge the second cluster with the first cluster;
    generating a different hello packet by referencing the updated apparatus identification information of the node apparatuses, which is stored in the cluster information memory; and
    transmitting the different hello packet.

2. The node apparatus according to claim 1, wherein
    the hello packet includes apparatus identification information of the node apparatuses included in the second cluster as a merge node list,
    storing the apparatus identification information of the node apparatuses included in the second cluster included in the merge node list is comprised, and
    the hello packet generation unit generates the different hello packet by referencing the merge node list stored in the merge node list memory.

3. The node apparatus according to claim 1, wherein
    the hello packet transmitted by the node apparatus included in the second cluster includes, as part of a merge cluster list, one piece of the apparatus identification information of the node apparatus included in the first cluster in order to notify the node apparatus included in the second cluster that a merge request is issued from the first cluster to the node apparatus included in the second cluster,
    storing the merge cluster list, and
    the hello packet generation unit generates the different hello packet by referencing the merge cluster list stored in the merge cluster list memory.

4. The node apparatus according to claim 1, wherein
    the hello packet transmitted by the node apparatus included in the second cluster includes, as part of a merge node list, apparatus identification information of the node apparatus included in the second cluster,
    storing the merge node list, and
    the hello packet generation unit generates the different hello packet by referencing the merge node list stored in the merge node list memory.

5. The node apparatus according to claim 4, wherein
    when the apparatus identification information of the node apparatuses included in the second cluster included in the merge cluster list and the apparatus identification information of the node apparatuses included in the second cluster, which is stored in the cluster information memory of the node apparatus included in the second cluster, match, the apparatus identification information of the node apparatuses included in the second cluster included in the merge cluster list are moved to the merge node list.

6. The node apparatus according to claim 1, wherein
    a specific ratio to the maximum number of cluster nodes is 40 to 60 percent.

7. A communication method, comprising:
    storing apparatus identification information of node apparatus included in a first cluster, which is a group of node apparatuses route information of which is stored by the node apparatus, among a plurality of node apparatuses in a network including a plurality of node apparatuses;
    receiving, from adjacent node apparatus, a hello packet used to notify route information about a route for conveying information in the network, and apparatus identification information of node apparatus included in a second cluster, which is a group of node apparatuses route information of which is stored by the adjacent node apparatus;
    verifying that the number of node apparatuses included in the first cluster is equal to or lower than a specified ratio to a maximum number of cluster nodes defined with a specified integer value, and that the number does not change for a specified amount of time;
    obtaining the number of node apparatuses included in the first cluster based on the apparatus identification information of the node apparatuses, which is stored in a cluster information memory, upon receipt of the hello packet from one of adjacent node apparatuses included in the second cluster different from the first cluster, and determining whether a total of the number of node apparatuses included in the first cluster and the number of node apparatuses included in the second cluster is equal to or smaller than the maximum number of cluster nodes;

updating the apparatus identification information of the node apparatuses included in the second cluster to the apparatus identification information of the node apparatuses included in the first cluster based on a result of the determination, and merging the second cluster with the first cluster; and generating a different hello packet by referencing the apparatus identification information of the node apparatus.

8. The communication method according to claim 7, wherein the hello packet includes, as a merge node list, the apparatus identification information of the node apparatuses included in the second cluster, the method further comprising:

storing the apparatus identification information of the node apparatuses included in the second cluster included in the merge node list; and generating a different hello packet by referencing the merge node list stored in the merge node list memory.

9. The method according to claim 7, wherein the hello packet transmitted by the node apparatus included in the second cluster includes, as part of a merge cluster list, one piece of apparatus identification information of the node apparatus included in the first cluster in order to notify the node apparatus included in the second cluster that a merge request is issued from the first cluster, the method further comprising:

storing the merge cluster list; and generating another hello packet by referencing the stored merge cluster list.

10. The communication method according to claim 7, wherein the hello packet transmitted by the node apparatus included in the second cluster includes, as part of a merge node list, the apparatus identification information of the node apparatus included in the second cluster, the method further comprising:

storing the merge node list; and generating the different hello packet by referencing the merge node list stored in the merge node list memory.

11. The communication method according to claim 10, wherein when the apparatus identification information of the node apparatuses included in the second cluster included in the merge cluster list and the apparatus identification information of the node apparatuses included in the second cluster stored in the cluster information memory of the node apparatus included in the second cluster match, the apparatus identification information of the node apparatuses included in the second cluster included in the merge cluster list are moved to the merge node list.

12. The communication method according to claim 7, wherein a specified ratio to the maximum number of cluster nodes is 40 to 60 percent.

* * * * *